US010275824B2

(12) United States Patent
Peterson et al.

(10) Patent No.: US 10,275,824 B2
(45) Date of Patent: Apr. 30, 2019

(54) CONCEPTS FOR TRANSACTING E-COMMERCE

(71) Applicant: UNITED PARCEL SERVICE OF AMERICA, INC., Atlanta, GA (US)

(72) Inventors: Erik E. Peterson, Marietta, GA (US); Nagesh Kadaba, Roswell, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 873 days.

(21) Appl. No.: 14/467,512

(22) Filed: Aug. 25, 2014

(65) Prior Publication Data

US 2015/0073936 A1  Mar. 12, 2015

Related U.S. Application Data

(60) Provisional application No. 61/875,857, filed on Sep. 10, 2013.

(51) Int. Cl.
*G06Q 30/00* (2012.01)
*G06Q 30/06* (2012.01)
*G06Q 30/02* (2012.01)
*G06Q 10/08* (2012.01)

(52) U.S. Cl.
CPC ..... *G06Q 30/0639* (2013.01); *G06Q 10/0835* (2013.01); *G06Q 30/0282* (2013.01)

(58) Field of Classification Search
CPC ........... G06Q 30/0601–30/0645; G06Q 30/08; G06Q 30/0639; G06Q 30/0282; G06Q 10/0835
USPC .......................... 705/26.1–27.2, 26.9, 26, 27
See application file for complete search history.

(56) References Cited

U.S. PATENT DOCUMENTS

| | | | | |
|---|---|---|---|---|
| 7,499,871 B1 * | 3/2009 | McBrayer | ............ | G06Q 10/063 705/7.11 |
| 8,073,753 B2 | 12/2011 | Cunniff et al. | | |
| 8,438,088 B2 | 5/2013 | Cunniff et al. | | |
| 8,600,913 B2 | 12/2013 | Williams et al. | | |
| 8,793,194 B2 * | 7/2014 | Lee | ........................ | G06Q 50/12 705/330 |
| 2002/0123943 A1 | 9/2002 | Gupta et al. | | |
| 2005/0137935 A1 * | 6/2005 | Lee | ........................ | G06Q 50/12 705/15 |
| 2006/0247982 A1 | 11/2006 | Stolfo et al. | | |

(Continued)

FOREIGN PATENT DOCUMENTS

WO    WO 2001/011523 A1    2/2001

OTHER PUBLICATIONS

Teng et al.: "A model for evaluation and selection of suppliers in global textile and apparel supply chains," International Journal of Physical Distribution & Logistics Management 35.7/8: 503-523. Emerald Group Publishing Limited; ProQuest Dialog #232592750, 21pgs. (Year: 2005).*

(Continued)

*Primary Examiner* — Robert M Pond
(74) *Attorney, Agent, or Firm* — Shook, Hardy & Bacon L.L.P.

(57) ABSTRACT

Computer program products, methods, systems, apparatus, and computing entities are provided for transacting e-commerce. In one embodiment, item information is stored for a plurality of items available for purchase from respective sellers. The item information that is displayed for each item can depend on the delivery zone of the customer.

21 Claims, 28 Drawing Sheets

(56) References Cited

U.S. PATENT DOCUMENTS

2012/0072363 A1* 3/2012 Spiegel ................. G06Q 10/08
705/336
2013/0060598 A1 3/2013 Dudley et al.
2013/0144800 A1* 6/2013 Fallows ............. G06Q 30/0282
705/341

OTHER PUBLICATIONS

International Searching Authority, International Search Report and Written Opinion for International Application No. PCT/US2014/52659, dated Apr. 2, 2015, 8 pages, United States Patent and Trademark Office, USA.

Canadian Intellectual Property Office, Requisition by the Examiner for Application No. 2,923,810, dated Mar. 16, 2017, 6 pages, Canada.

* cited by examiner

| Zones 1 Lbs. | 2 | 3 | 4 | 5 | 6 | 7 | 8 | 44 | 45 | 46 |
|---|---|---|---|---|---|---|---|---|---|---|
| 2 | $5.84 | $6.23 | $6.41 | $6.69 | $7.00 | $7.09 | $7.21 | $22.23 | $22.23 | $29.30 |
| 3 | 6.35 | 6.77 | 7.33 | 7.49 | 7.88 | 7.98 | 8.27 | 24.71 | 24.71 | 31.67 |
| 4 | 6.45 | 7.07 | 7.71 | 7.95 | 8.36 | 8.55 | 9.13 | 26.82 | 26.82 | 33.71 |
| 5 | 6.60 | 7.25 | 8.10 | 8.47 | 8.79 | 9.12 | 9.80 | 29.45 | 29.45 | 36.56 |
| 6 | 6.78 | 7.33 | 8.42 | 8.81 | 9.11 | 9.50 | 10.32 | 31.96 | 31.96 | 38.99 |
| 7 | 6.95 | 7.55 | 8.55 | 9.01 | 9.28 | 9.78 | 10.55 | 34.65 | 34.65 | 40.70 |
| 8 | 7.27 | 7.75 | 8.70 | 9.22 | 9.54 | 10.04 | 10.85 | 36.98 | 36.98 | 42.77 |
| 9 | 7.54 | 7.94 | 8.93 | 9.39 | 9.83 | 10.37 | 11.38 | 38.24 | 38.24 | 44.89 |
| 10 | 7.69 | 8.13 | 9.06 | 9.55 | 10.04 | 10.91 | 12.09 | 40.93 | 40.93 | 47.56 |
| 11 | 7.94 | 8.16 | 9.20 | 9.82 | 10.45 | 11.66 | 12.89 | 43.47 | 43.47 | 50.09 |
| 12 | 8.21 | 8.49 | 9.28 | 9.89 | 10.70 | 12.40 | 13.65 | 45.85 | 45.85 | 52.44 |
| 13 | 8.43 | 8.75 | 9.40 | 10.12 | 11.12 | 13.14 | 14.56 | 47.83 | 47.83 | 54.37 |
| 14 | 8.64 | 8.96 | 9.52 | 10.32 | 11.60 | 13.94 | 15.50 | 49.80 | 49.80 | 56.32 |
| 15 | 8.80 | 9.21 | 9.65 | 10.51 | 12.20 | 14.66 | 16.39 | 51.88 | 51.88 | 58.36 |
| 16 | 8.95 | 9.50 | 9.79 | 10.84 | 12.79 | 15.41 | 17.25 | 53.79 | 53.79 | 60.25 |
| 17 | 9.08 | 9.64 | 9.82 | 11.02 | 13.24 | 15.94 | 17.87 | 56.29 | 56.29 | 62.75 |
| 18 | 9.16 | 9.94 | 10.10 | 11.47 | 13.92 | 16.77 | 18.81 | 58.93 | 58.93 | 64.99 |
| 19 | 9.27 | 10.07 | 10.40 | 12.07 | 14.57 | 17.50 | 19.76 | 61.60 | 61.60 | 67.65 |
| 20 | 9.39 | 10.42 | 10.79 | 12.52 | 15.20 | 18.24 | 20.71 | 64.09 | 64.09 | 70.12 |
| 21 | 9.56 | 10.76 | 11.16 | 13.01 | 15.87 | 18.95 | 21.67 | 66.48 | 66.48 | 72.51 |
| 22 | 9.72 | 11.05 | 11.50 | 13.52 | 16.52 | 19.70 | 22.54 | 68.00 | 68.00 | 74.03 |
| 23 | 9.96 | 11.32 | 11.92 | 13.98 | 17.19 | 20.45 | 23.52 | 70.12 | 70.12 | 76.14 |
| 24 | 10.17 | 11.67 | 12.30 | 14.48 | 17.84 | 21.19 | 24.47 | 72.24 | 72.24 | 78.24 |
| 25 | 10.37 | 11.97 | 12.69 | 14.95 | 18.52 | 21.93 | 25.43 | 74.61 | 74.61 | 80.60 |
| 26 | 10.64 | 12.30 | 13.03 | 15.38 | 19.16 | 22.66 | 26.37 | 76.93 | 76.93 | 82.94 |
| 27 | 10.89 | 12.55 | 13.39 | 15.86 | 19.86 | 23.32 | 27.25 | 79.36 | 79.36 | 85.54 |
| 28 | 11.14 | 12.85 | 13.71 | 16.35 | 20.51 | 24.08 | 28.19 | 81.55 | 81.55 | 87.75 |
| 29 | 11.34 | 13.16 | 14.15 | 16.85 | 21.16 | 24.76 | 29.16 | 83.75 | 83.75 | 89.96 |
| 30 | 11.58 | 13.41 | 14.55 | 17.24 | 21.77 | 25.37 | 30.04 | 85.81 | 85.81 | 91.78 |
| 31 | 11.87 | 13.74 | 14.99 | 17.75 | 22.43 | 26.05 | 31.00 | 87.86 | 87.86 | 93.87 |
| 32 | 12.04 | 13.94 | 15.33 | 18.22 | 23.04 | 26.75 | 31.87 | 89.86 | 89.86 | 96.05 |
| 33 | 12.10 | 14.24 | 15.74 | 18.72 | 23.70 | 27.47 | 32.83 | 91.79 | 91.79 | 98.00 |
| 34 | 12.31 | 14.56 | 16.13 | 19.22 | 24.32 | 28.19 | 33.73 | 93.71 | 93.71 | 99.94 |
| 35 | 12.38 | 14.89 | 16.49 | 19.70 | 25.00 | 28.94 | 34.68 | 95.81 | 95.81 | 101.99 |
| 36 | 12.60 | 15.23 | 16.88 | 20.18 | 25.63 | 29.68 | 35.59 | 98.18 | 98.18 | 104.35 |

Fig. 5

| Weight (Lbs.) | Next Day Air Early A.M. | Next Day Air | Next Day Air Saver | 2nd Day Air A.M. | 2nd Day Air | 3 Day Select | Ground |
|---|---|---|---|---|---|---|---|
| 1 | $52.85 | $22.85 | $19.50 | $14.55 | $12.65 | $7.50 | $5.84 |
| 2 | $53.30 | $23.30 | $20.90 | $14.70 | $12.80 | $7.70 | $6.35 |
| 3 | $56.25 | $26.25 | $22.40 | $14.80 | $12.85 | $8.40 | $6.45 |
| 4 | $58.30 | $28.30 | $24.15 | $15.25 | $13.25 | $9.25 | $6.60 |
| 5 | $58.75 | $28.75 | $24.55 | $15.70 | $13.65 | $9.85 | $6.78 |
| 6 | $61.70 | $31.70 | $25.95 | $16.35 | $14.25 | $10.45 | $6.95 |
| 7 | $63.15 | $33.15 | $26.75 | $17.05 | $14.80 | $10.80 | $7.27 |
| 8 | $63.45 | $33.45 | $28.15 | $17.75 | $15.45 | $11.35 | $7.54 |
| 9 | $63.45 | $33.45 | $28.15 | $18.70 | $16.25 | $12.05 | $7.69 |
| 10 | $63.45 | $33.45 | $28.15 | $19.55 | $17.00 | $12.75 | $7.94 |
| 11 | $63.45 | $33.45 | $28.15 | $20.45 | $17.75 | $13.55 | $8.21 |
| 12 | $63.45 | $33.45 | $28.15 | $21.50 | $18.70 | $14.25 | $8.43 |
| 13 | $63.45 | $33.45 | $28.15 | $23.00 | $20.00 | $15.10 | $8.64 |
| 14 | $63.45 | $33.45 | $28.15 | $24.10 | $20.95 | $15.55 | $8.80 |
| 15 | $63.45 | $33.45 | $28.15 | $25.05 | $21.80 | $16.30 | $8.95 |
| 16 | $63.45 | $33.45 | $28.15 | $25.70 | $22.35 | $16.55 | $9.08 |
| 17 | $63.45 | $33.45 | $28.15 | $26.45 | $23.00 | $17.10 | $9.16 |
| 18 | $63.45 | $33.45 | $28.15 | $27.35 | $23.80 | $17.70 | $9.27 |
| 19 | $63.45 | $33.45 | $28.15 | $28.40 | $24.70 | $18.25 | $9.39 |
| 20 | $63.45 | $33.45 | $28.15 | $29.40 | $25.60 | $18.80 | $9.56 |

Shipping Charges — from Seattle, WA

| UPS Time in Transit | to Seattle, WA | to San Francisco, CA | to Denver, CO | to Kansas City, MO | to Atlanta, GA | |
|---|---|---|---|---|---|---|
| 1 | $39.83 | $60.36 | $64.59 | $66.40 | $68.26 | Next Day Air Early |
| 1 | $18.47 | $39.01 | $43.24 | $45.06 | $46.90 | Next Day Air |
| 1 | $8.21 | $35.23 | $39.04 | $40.61 | $42.24 | 2nd Day Air A.M. |
| 2 | | $15.99 | $20.99 | $22.17 | $23.21 | |
| 2 | | $9.67 | $17.73 | $19.29 | $20.18 | |
| 3 | | | $10.20 | $14.99 | $15.59 | |
| 4 | | | | $10.41 | $13.17 | |
| 5 | | | | | $10.76 | |

Shipping Charges

| to Seattle, WA | to San Francisco, CA | to Denver, CO | to Kansas City, MO | to Atlanta, GA | |
|---|---|---|---|---|---|
| $39.83 | $60.36 | $64.59 | $66.40 | $68.26 | Next Day Air Early |
| $18.47 | $39.01 | $43.24 | $45.06 | $46.90 | Next Day Air |
| $8.21 | $35.23 | $39.04 | $40.61 | $42.24 | 2nd Day Air A.M. |
| | $15.99 | $20.99 | $22.17 | $23.21 | |
| | $9.67 | $17.73 | $19.29 | $20.18 | |
| | | $10.20 | $14.99 | $15.59 | |
| | | | $10.41 | $13.17 | |
| | | | | $10.76 | |

Fig. 8

"Net Price" Outcome from Seattle, WA / UPS Time in Transit

Shipping Charges:

| to (days) | to Seattle, WA | to San Francisco, CA | to Denver, CO | to Kansas City, MO | to Atlanta, GA | Service |
|---|---|---|---|---|---|---|
| 1 | $39.83 | $60.36 | $64.59 | $66.40 | $68.26 | Next Day Air Early |
| 1 | $18.47 | $39.01 | $43.24 | $45.05 | $46.90 | Next Day Air |
| 2 | $8.21 | $35.23 | $39.04 | $40.61 | $42.24 | 2nd Day Air A.M. |
| 2 | | $15.59 | $20.39 | $22.17 | $23.21 | |
| 3 | | $9.67 | $17.73 | $19.29 | $20.18 | |
| 4 | | | $10.20 | $14.59 | $15.59 | |
| 5 | | | | $10.41 | $13.17 | |
| | | | | | $10.76 | |

[Enter Net Price]

| | to Seattle, WA | to San Francisco, CA | to Denver, CO | to Kansas City, MO | to Atlanta, GA |
|---|---|---|---|---|---|
| 1 | $228.00 | $226.00 | $222.00 | $220.00 | $220.00 |
| 1 | $232.00 | $230.00 | $226.00 | $224.00 | $224.00 |
| 2 | $234.00 | $232.00 | $228.00 | $226.00 | $226.00 |
| 2 | | $234.00 | $230.00 | $228.00 | $228.00 |
| 3 | | $236.00 | $232.00 | $230.00 | $230.00 |
| 4 | | | $234.00 | $232.00 | $232.00 |
| 5 | | | | $236.00 | $234.00 |
| | | | | | $235.00 |

Displayed Price:

| | to Seattle, WA | to San Francisco, CA | to Denver, CO | to Kansas City, MO | to Atlanta, GA |
|---|---|---|---|---|---|
| 1 | $267.83 | $286.36 | $288.59 | $288.40 | $288.26 |
| 1 | $250.47 | $269.01 | $271.24 | $271.05 | $270.90 |
| 2 | $242.21 | $267.23 | $269.04 | $268.61 | $268.24 |
| 2 | | $249.59 | $252.39 | $252.17 | $251.21 |
| 3 | | $245.67 | $251.73 | $251.29 | $250.18 |
| 4 | | | $246.20 | $248.59 | $247.59 |
| 5 | | | | $246.41 | $247.17 |
| | | | | | $245.76 |

"Displayed Price" Outcome (Round to $0.99 Feature Available)

Shipping Charges:

| | to Seattle, WA | to San Francisco, CA | to Denver, CO | to Kansas City, MO | to Atlanta, GA | Service |
|---|---|---|---|---|---|---|
| 1 | $39.83 | $60.36 | $64.59 | $66.40 | $68.26 | Next Day Air Early |
| 1 | $18.47 | $39.01 | $43.24 | $45.05 | $46.90 | Next Day Air |
| 2 | $8.21 | $35.23 | $39.04 | $40.61 | $42.24 | 2nd Day Air A.M. |
| 2 | | $15.59 | $20.39 | $22.17 | $23.21 | |
| 3 | | $9.67 | $17.73 | $19.29 | $20.18 | |
| 4 | | | $10.20 | $14.59 | $15.59 | |
| 5 | | | | $10.41 | $13.17 | |
| | | | | | $10.76 | |

Net Price:

| | to Seattle, WA | to San Francisco, CA | to Denver, CO | to Kansas City, MO | to Atlanta, GA |
|---|---|---|---|---|---|
| 1 | $215.17 | $199.64 | $200.41 | $203.60 | $206.74 |
| 1 | $231.53 | $215.99 | $216.76 | $219.95 | $223.10 |
| 2 | $236.79 | $214.77 | $215.96 | $219.39 | $222.76 |
| 2 | | $231.91 | $229.61 | $232.83 | $236.80 |
| 3 | | $235.33 | $229.77 | $230.71 | $234.82 |
| 4 | | | $234.80 | $232.91 | $234.41 |
| 5 | | | | $234.59 | $234.33 |
| | | | | | $234.25 |

[Enter Displayed Price]

| | to Seattle, WA | to San Francisco, CA | to Denver, CO | to Kansas City, MO | to Atlanta, GA |
|---|---|---|---|---|---|
| 1 | $255.00 | $260.00 | $265.00 | $270.00 | $275.00 |
| 1 | $250.00 | $255.00 | $260.00 | $265.00 | $270.00 |
| 2 | $245.00 | $250.00 | $255.00 | $260.00 | $265.00 |
| 2 | | $247.50 | $250.00 | $255.00 | $260.00 |
| 3 | | $245.00 | $247.50 | $250.00 | $255.00 |
| 4 | | | $245.00 | $247.50 | $250.00 |
| 5 | | | | $245.00 | $247.50 |
| | | | | | $245.00 |

Shipper #1 - Same Day Handling

| Selection | Days Until Actual Arrival | Number of UPS Ground Transit Days from Seller to Buyer | | | | |
|---|---|---|---|---|---|---|
| | | 1 Day | 2 Days | 3 Days | 4 Days | 5 Days |
| 1 | | Next Day Air Early A.M. | Next Day Air Early A.M. | Next Day Air Early A.M. | Next Day Air Early A.M. | Next Day Air Early A.M. |
| 1 (Default) | | Next Day Air | Next Day Air Saver | Next Day Air Saver | Next Day Air Saver | Next Day Air Saver |
| 1 (Default) | | Ground | 2 Day Air A.M. | 2 Day Air A.M. | 2 Day Air A.M. | 2 Day Air A.M. |
| 2 | | n/a | Ground | 2 Day Air | 2 Day Air | 2 Day Air |
| 2 (Default) | | n/a | n/a | Ground | 3 Day Select | 3 Day Select |
| 3 | | n/a | n/a | n/a | Ground | n/a |
| 4 | | n/a | n/a | n/a | n/a | Ground |

Shipper #2 - 1 One Handling

| Selection | Days Until Actual Arrival | Number of UPS Ground Transit Days from Seller to Buyer | | | | |
|---|---|---|---|---|---|---|
| | | 1 Day | 2 Days | 3 Days | 4 Days | 5 Days |
| 1 | | Not Available | Not Available | Not Available | Not Available | Not Available |
| 2 | | Next Day Air Early A.M. | Next Day Air Early A.M. | Next Day Air Early A.M. | Next Day Air Early A.M. | Next Day Air Early A.M. |
| 2 | | Next Day Air | Next Day Air Saver | Next Day Air Saver | Next Day Air Saver | Next Day Air Saver |
| 3 | | Ground | 2 Day Air A.M. | 2 Day Air A.M. | 2 Day Air A.M. | 2 Day Air A.M. |
| 3 (Default) | | n/a | Ground | 2 Day Air | 2 Day Air | 2 Day Air |
| 4 | | n/a | n/a | Ground | 3 Day Select | 3 Day Select |
| 5 | | n/a | n/a | n/a | Ground | n/a |
| 6 | | n/a | n/a | n/a | n/a | Ground |

Example of Contrast Between Same Day Handling & One Day Handling

| Handling Time (days) | # Transactions | # On Time | # Times Missed | Cumulative Late Days | Average Delay (days) | Batting Avg. |
|---|---|---|---|---|---|---|
| Same Day | 55 | 50 | 5 | 1.40 | 91% | 91% |
| Next Day | 132 | 120 | 12 | 1.25 | 91% | 91% |
| Additional | 15 | 13 | 2 | 2.50 | 87% | 87% |
| Combined | 202 | 183 | 19 | 1.42 | 91% | 91% |

Batting Avg. 91% ← 183/202 = 91%
Delay Penalty -2% ← Log(1.42,7)/10 = 2%
Adjusted Rating 89%

Fig. 16

| Item Price | Days Until Arrival | Item Condition (Seller) | Seller | Handling Score | Seller Rating | Handling Time (Seller) | Days in Transit (UPS) | UPS Shipment Arrival Information |
|---|---|---|---|---|---|---|---|---|
| $244.67 | 2 | Very Good | Big Apple Phones | 97% | 97% | 0 | 2 | Arrives by UPS Ground Service on Tuesday, July 16, 2013 |
| $251.29 | 3 | Very Good | Wireless Everything | 95% | 98% | 1 | 2 | Arrives by UPS 2 Day Air Service on Wednesday, July 17, 2013 |
| $251.59 | 4 | Very Good | Wireless Everything | 95% | 98% | 1 | 3 | Arrives by UPS 3 Day Select Service on Thursday, July 18, 2013 |
| $252.41 | 5 | Very Good | Wireless Everything | 95% | 98% | 1 | 4 | Arrives by UPS Ground Service on Friday, July 19, 2013 |
| $255.67 | 4 | Good | Gotham Traders | 95% | 98% | 2 | 2 | Arrives by UPS Ground Service on Thursday, July 18, 2013 |
| $257.77 | 7 | Good | Giant Phones | 98% | 98% | 2 | 5 | Arrives by UPS Ground Service on Tuesday, July 23, 2013 |
| $258.30 | 4 | Good | Giant Phones | 98% | 98% | 2 | 2 | Arrives by UPS Ground Service on Thursday, July 18, 2013 |
| $259.33 | 5 | Good | Giant Phones | 98% | 98% | 2 | 3 | Arrives by UPS 3 Day Select Service on Friday, July 19, 2013 |
| $267.61 | 2 | Very Good | Wireless Everything | 95% | 98% | 1 | 1 | Arrives by UPS Next Day Air Service on Tuesday, July 16, 2013 |
| $267.77 | 7 | Good | Trader Tommy | 98% | 98% | 2 | 5 | Arrives by UPS Ground Service on Tuesday, July 23, 2013 |
| $269.30 | 4 | Good | Trader Tommy | 98% | 98% | 2 | 2 | Arrives by UPS Ground Service on Thursday, July 18, 2013 |
| $269.33 | 5 | Good | Trader Tommy | 98% | 98% | 2 | 3 | Arrives by UPS 3 Day Select Service on Friday, July 19, 2013 |
| $269.67 | 4 | Good | Goblins & Ghosts | 95% | 98% | 2 | 2 | Arrives by UPS Ground Service on Thursday, July 18, 2013 |
| $275.23 | 1 | Very Good | Big Apple Phones | 97% | 97% | 0 | 1 | Arrives by UPS Next Day Air Service on Monday, July 15, 2013 |
| $275.33 | 3 | Good | Gotham Traders | 95% | 98% | 2 | 1 | Arrives by UPS Next Day Air Service on Wednesday, July 17, 2013 |
| $278.17 | 3 | Good | Giant Phones | 98% | 98% | 2 | 1 | Arrives by UPS Next Day Air Service on Wednesday, July 17, 2013 |
| $288.17 | 3 | Good | Trader Tommy | 98% | 98% | 2 | 1 | Arrives by UPS Next Day Air Service on Wednesday, July 17, 2013 |
| $295.23 | 3 | Good | Goblins & Ghosts | 95% | 98% | 2 | 1 | Arrives by UPS Next Day Air Service on Wednesday, July 17, 2013 |

Fig. 17

| | Item Price | Days Until Arrival | Item Condition (Seller) | Seller | Handling Score | Seller Rating | Handling Time (Seller) | Days in Transit (UPS) |
|---|---|---|---|---|---|---|---|---|
| 1 | $243.21 | 2 | Very Good | Jackets Yellow | 91% | 91% | 1 | 1 |
| 2 | $243.21 | 2 | Fair | Peach State Cellular | 90% | 89% | 1 | 1 |
| 3 | $244.67 | 2 | Very Good | Big Apple Phones | 97% | 97% | 0 | 2 |
| 4 | $245.41 | 5 | Very Good | Value Wireless | 75% | 98% | 1 | 4 |
| 5 | $248.21 | 2 | Good | Carolina Wholesale | 92% | 79% | 1 | 1 |
| 6 | $249.59 | 4 | Very Good | Value Wireless | 75% | 98% | 1 | 3 |
| 7 | $250.20 | 3 | Good | FunkyMonkey | 92% | 92% | 0 | 3 |
| 8 | $251.29 | 3 | Very Good | Wireless Everything | 95% | 98% | 1 | 2 |
| 9 | $251.59 | 4 | Very Good | Wireless Everything | 95% | 98% | 1 | 3 |
| 10 | $252.41 | 5 | Very Good | Wireless Everything | 95% | 98% | 1 | 4 |

Recovering from your handling delay:

Can UPS upgrade the current service level to meet your delivery commitment to your customer?

○ Yes, please upgrade to UPS 2 Day Air Service for an on time delivery for an additional $9.50 charge ○ No, please inform the customer of the handling delay and include the following statement:

Coordinating your package delivery:

Can you help with delivery preference?

● Probably home on scheduled delivery day ○ Morning
○ Prefer to have package left → ○ Afternoon
  ○ Front door  ○ Both
  ○ Back door
  ○ Near garage door
  ○ With trusted neighbor [_____]

Can you help with communication?

● UPS to send text msg shortly before arrival
○ UPS to send email msg shortly before arrival

| Days until Arrival | Selection | Number of UPS Ground Transit Days from Seller to Buyer | | | | |
|---|---|---|---|---|---|---|
| | | 1 Day | 2 Days | 3 Days | 4 Days | 5 Days |
| 1 | | Next Day Air Early A.M. | Next Day Air Early A.M. | Next Day Air Early A.M. | Next Day Air Early A.M. | Next Day Air Early A.M. |
| 1 | | Next Day Air | Next Day Air Saver | Next Day Air Saver | Next Day Air Saver | Next Day Air Saver |
| 1 (Default) | | Ground | 2 Day Air A.M. | 2 Day Air A.M. | 2 Day Air A.M. | 2 Day Air A.M. |
| 2 | | n/a | Ground | 2 Day Air | 2 Day Air | 2 Day Air |
| 2 (Default) | | n/a | n/a | Ground | 3 Day Select | 3 Day Select |
| 3 | | n/a | n/a | n/a | Ground | n/a |
| 4 | | n/a | n/a | n/a | n/a | Ground |
| 5 | | n/a | n/a | n/a | n/a | |

Fig. 22

Example of Available UPS Products (Same Day Handling)

| Service Received | Points Earned |
|---|---|
| Next Day Air Early A.M. | 7 |
| Next Day Air | 6 |
| Next Day Air Saver | 5 |
| 2nd Day Air A.M. | 4 |
| 2nd Day Air | 3 |
| 3 Day Select | 2 |
| Ground | 1 |

| Shipping | Upgrade | Days/Service |
|---|---|---|
| $68.26 | $57.50 | Next Day Air Early A.M. |
| $46.90 | $36.15 | Next Day Air |
| $42.24 | $31.49 | 1 Day |
| $23.21 | $12.45 | 2nd Day Air A.M. |
| $20.18 | $9.42 | 2 Days |
| $15.59 | $4.83 | 3 Days |
| $13.17 | $2.42 | 4 Days |
| $10.76 | | 5 Days |

Fig. 23

| # | Days Until Arrival | Seller | Handling Time (Seller) | Days in Transit (UPS) | UPS Product | Reward Points | Point Tracker |
|---|---|---|---|---|---|---|---|
| 1 | 3 | C3PO Cellular | 0 | 3 | 3 Day Select Service | 2 | 2 |
| 2 | 3 | Wireless Everything | 1 | 2 | 2 Day Air Service | 3 | 5 |
| 3 | 3 | Blue Star Traders | 1 | 2 | Ground Service | 1 | 6 |
| 4 | 3 | Cowboy Way | 1 | 2 | Ground Service | 1 | 7 |
| 5 | 3 | iForSale | 1 | 2 | Ground Service | 1 | 8 |
| 6 | 3 | Lone Star Traders | 1 | 2 | Ground Service | 1 | 9 |
| 7 | 3 | Gotham Traders | 2 | 1 | Next Day Air Saver Service | 5 | 14 |
| 8 | 3 | Giant Phones | 2 | 1 | Next Day Air Saver Service | 5 | 19 |
| 9 | 3 | Trader Tommy | 2 | 1 | Next Day Air Saver Service | 5 | 24 |
| 10 | 3 | Goblins & Ghosts | 2 | 1 | Next Day Air Service | 6 | 30 |
| 11 | 4 | 1-Harry | 1 | 3 | 3 Day Select Service | 2 | 32 |
| 12 | 5 | 1-Harry | 1 | 5 | Ground Service | 1 | 33 |
| 13 | 1 | Best Value 4U | 0 | 1 | Next Day Air Early AM Service | 7 | 40 |
| 14 | 2 | Best Value 4U | 0 | 2 | 2 Day Air Service | 3 | 43 |
| 15 | 3 | Best Value 4U | 0 | 3 | 3 Day Select Service | 2 | 45 |
| 16 | 5 | Best Value 4U | 0 | 5 | Ground Service | 1 | 46 |
| 17 | 1 | Big Apple Phones | 0 | 1 | Next Day Air Service | 6 | 52 |
| 18 | 2 | Big Apple Phones | 0 | 2 | Ground Service | 1 | 53 |
| 19 | 2 | Blue Star Traders | 1 | 1 | Next Day Air Saver Service | 5 | 58 |
| 20 | 3 | Blue Star Traders | 1 | 2 | Ground Service | 1 | 59 |
|   |   |   |   |   | Average Service Level | 3.0 |   |

*** UPS calculates available upgrade based upon difference in charges (i.e. upgrading a 50 lbs package from ground to air)

Fig. 24

CONCEPTS FOR TRANSACTING E-COMMERCE

CROSS-REFERENCE TO RELATED APPLICATIONS

This application claims priority to U.S. Provisional Application No. 61/875,857 filed Sep. 10, 2013, which is hereby incorporated herein in its entirety by reference.

BACKGROUND

Carriers' services have become more ambiguous due to purposeful positioning by e-commerce sites, such as eBay.com and amazon.com, as under-branded commodities. In the typical e-commerce setting, sellers and e-commerce sites are not held fully accountable for variations in handling times (other than customer feedback for reviews), and often, such handling delays are improperly assumed to be as a result of carriers. Moreover, in many transactions, sellers and e-commerce sites agree to have delivered items that have been purchased within two business days of purchase. Further, e-commerce sites, such as eBay.com and amazon.com, have an advantage because their items are priced competitively and can be delivered quickly (and often times warehoused locally). Because of this, the speed and reliability of carrier transportation and logistics networks are often not considered as adding value to the transaction. Thus, a need exists to hold sellers and e-commerce sites accountable for handling times, improve carrier visibility, and provide improved features for as part of e-commerce transactions.

BRIEF SUMMARY

In general, embodiments of the present invention provide methods, apparatus, systems, computing devices, computing entities, and/or the like.

In accordance with one aspect, a method is provided. In one embodiment, the method comprises (1) storing item information for a plurality of items available for purchase from respective sellers, wherein (a) the item information for each of the plurality of items identifies two or more delivery zones to which the corresponding item is available for delivery, (b) each of the two or more delivery zones is associated with a shipping cost and a time in transit for the corresponding item, and (c) each of the respective sellers is associated with a seller profile; and (2) after a delivery zone for a customer is identified, causing display of at least a portion of the item information for each of the plurality of items available for purchase from the respective sellers based at least in part on the delivery zone for the customer.

In accordance with another aspect, a computer program product is provided. The computer program product may comprise at least one computer-readable storage medium having computer-readable program code portions stored therein, the computer-readable program code portions comprising executable portions configured to (1) store item information for a plurality of items available for purchase from respective sellers, wherein (a) the item information for each of the plurality of items identifies two or more delivery zones to which the corresponding item is available for delivery, (b) each of the two or more delivery zones is associated with a shipping cost and a time in transit for the corresponding item, and (c) each of the respective sellers is associated with a seller profile; and (2) after a delivery zone for a customer is identified, cause display of at least a portion of the item information for each of the plurality of items available for purchase from the respective sellers based at least in part on the delivery zone for the customer.

In accordance with yet another aspect, an apparatus comprising at least one processor and at least one memory including computer program code is provided. In one embodiment, the at least one memory and the computer program code may be configured to, with the processor, cause the apparatus to (1) store item information for a plurality of items available for purchase from respective sellers, wherein (a) the item information for each of the plurality of items identifies two or more delivery zones to which the corresponding item is available for delivery, (b) each of the two or more delivery zones is associated with a shipping cost and a time in transit for the corresponding item, and (c) each of the respective sellers is associated with a seller profile; and (2) after a delivery zone for a customer is identified, cause display of at least a portion of the item information for each of the plurality of items available for purchase from the respective sellers based at least in part on the delivery zone for the customer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
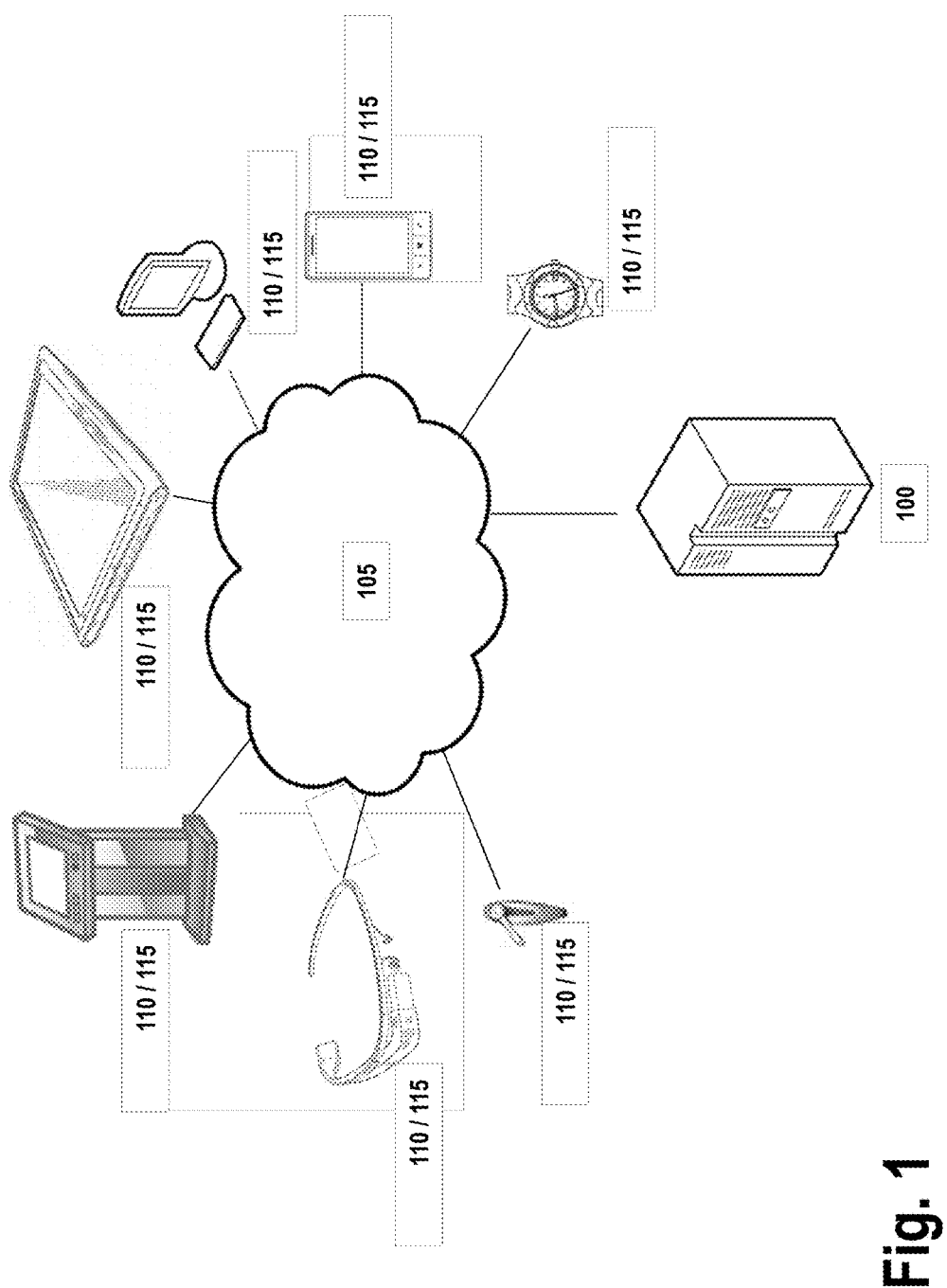
FIG. 1 is an overview of a system that can be used to practice embodiments of the present invention.

FIGS. 4A, 4B, 4C, 4D, and 4E are flowcharts illustrating operations and processes that can be used in accordance with various embodiments of the present invention.

FIGS. 5-9, 10A, 10B, 11-20, 21A, 21B, and 22-24 are exemplary input and output that can be produced in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more carrier platforms 100, one or more networks 105, one or more seller computing entities 110, and one or more buyer computing entities 115. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Carrier Platform

Figure 2:
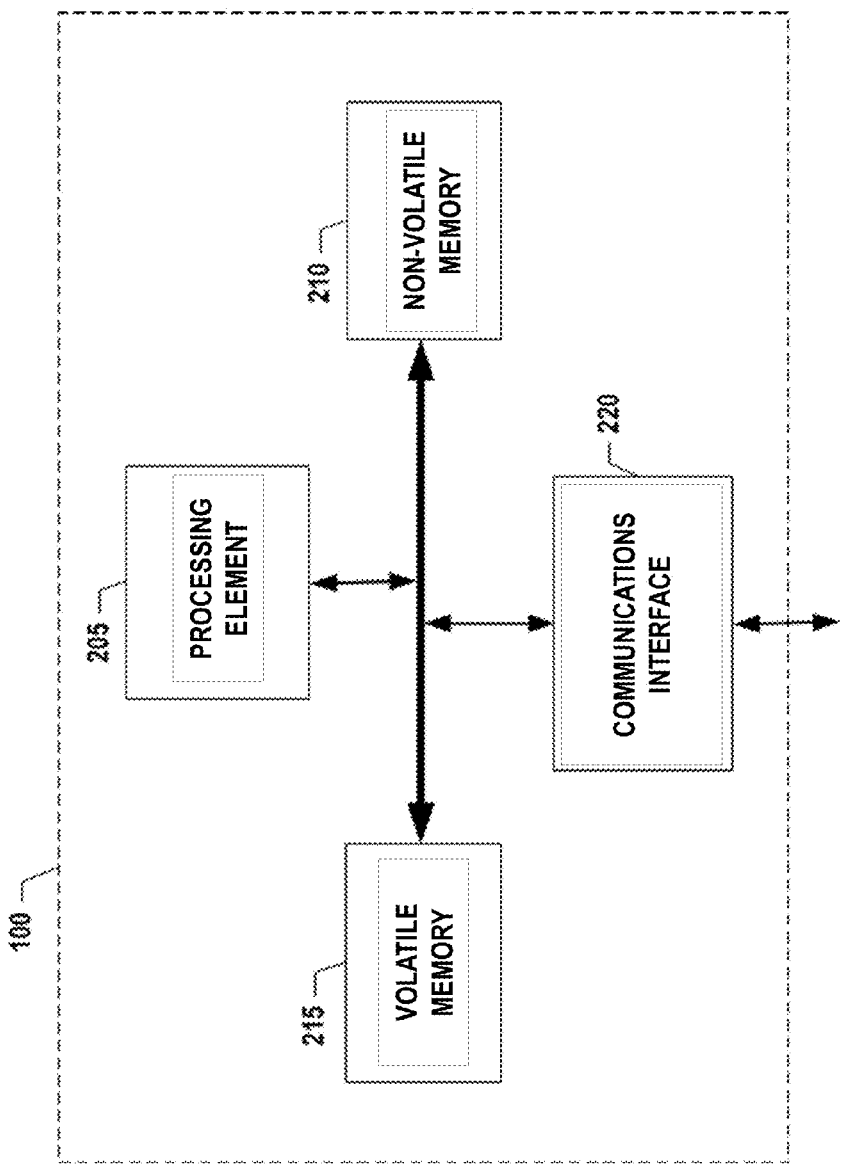
FIG. 2 is an exemplary schematic diagram of an e-commerce platform according to one embodiment of the present invention.

FIG. 2 provides a schematic of a carrier platform 100 according to one embodiment of the present invention. A carrier may be a traditional carrier, such as United Parcel Service (UPS), FedEx, DHL, courier services, the United States Postal Service (USPS), Canadian Post, and/or the like. However, a carrier may also be a nontraditional carrier, such as Amazon, Google, Uber, ride-sharing services, Macy's, and/or the like. Thus, the carrier platform 100 may be operated by a variety of entities. In general, the terms platform, network entity, computing entity, entity, device, system, the like, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The carrier platform 100 may also comprise, be associated with, and/or be in communication with various other systems and entities, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), mobile devices operated by carrier personnel, payment networks and systems, and a variety of other systems and their corresponding components. The carrier platform 100 may also comprise, be associated with, and/or be in communication with various payment systems and entities. Payments may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like.

As indicated, in one embodiment, the carrier platform 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the carrier platform 100 may communicate with one or more seller computing entities 110, one or more buyer computing entities 115, and/or the like.

As shown in FIG. 2, in one embodiment, the carrier platform 100 may include or be in communication with one or more processing elements 205 (also referred to as processors, processing circuitry, and/or similar terms used herein interchangeably) that communicate with other elements within the carrier platform 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier platform 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the carrier platform 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier platform 100 with the assistance of the processing element 205 and operating system.

As indicated, in one embodiment, the carrier platform 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier platform 100 may include or be in communication with one or more input elements, such as a keyboard input, a mouse input, a touch screen/display input, audio input, pointing device input, joystick input, keypad input, and/or the like. The carrier platform 100 may also include or be in communication with one or more output elements (not shown), such as audio output, video output, screen/display output, motion output, movement output, and/or the like.

As will be appreciated, one or more of the e-commerce platform's 100 components may be located remotely from other carrier platform 100 components, such as in a distributed system. Furthermore, one or more of the components may be combined and additional components performing functions described herein may be included in the carrier platform 100. Thus, the carrier platform 100 can be adapted to accommodate a variety of needs and circumstances. As will be recognized, these architectures and descriptions are provided for exemplary purposes only and are not limiting to the various embodiments.

2. Exemplary Seller Computing Entity

Figure 3:
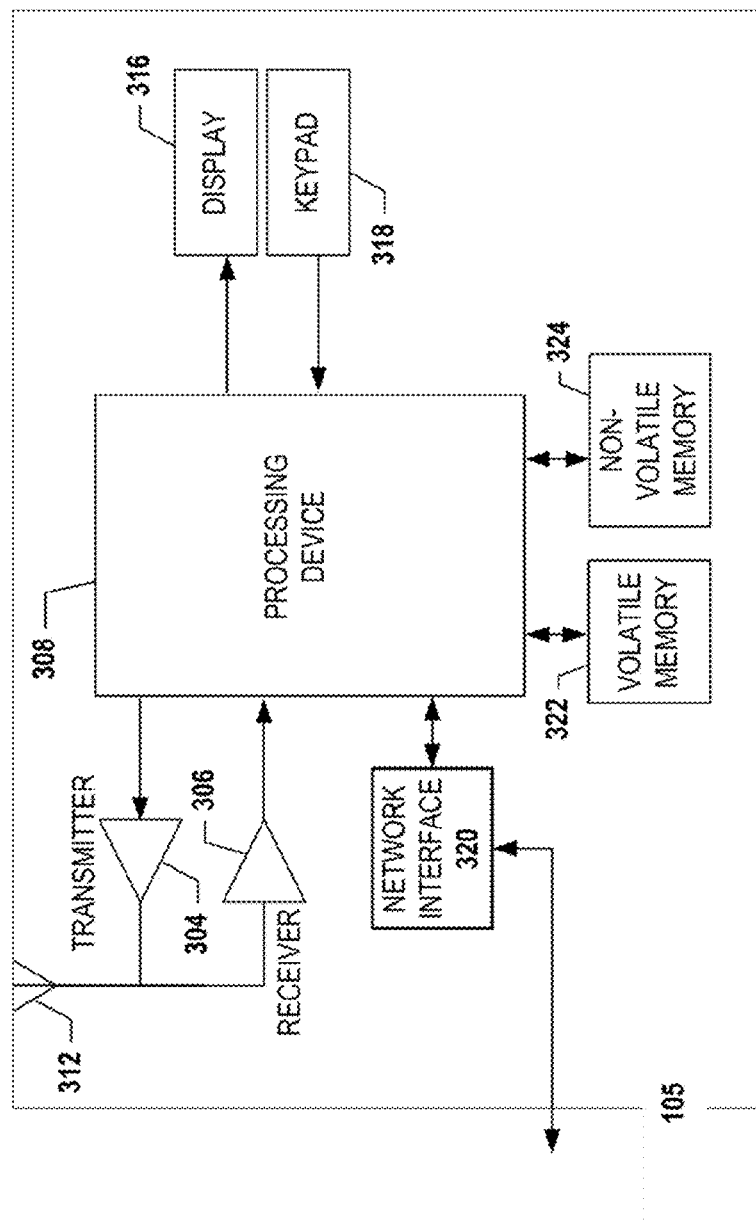
FIG. 3 is an exemplary schematic diagram of a computing entity according to one embodiment of the present invention.

A seller (also referred to herein as a user) may be an individual, a family, a company, an organization, an entity, a department within an organization, a representative of an organization and/or person, and/or the like selling or listing one or more items for sale through the carrier platform 100. To do so, a user may operate a seller computing entity 110. FIG. 3 provides an illustrative schematic representative of a seller computing entity 110 that can be used in conjunction with embodiments of the present invention. In general, the terms device, system, computing entity, entity, the like, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Seller computing entities 110 can be operated by various parties. As shown in FIG. 3, the seller computing entity 110 can include an antenna 312, a transmitter 304 (e.g., radio), a receiver 306 (e.g., radio), and a processing element 308 (such as those described above with regard to the carrier platform 100) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the seller computing entity 110 may be capable of operating with one or more air interface standards, communication protocols, modulation types, and access types. More particularly, the seller computing entity 110 may operate in accordance with any of a number of wireless communication standards and protocols, such as those described above with regard to the carrier platform 100. In a particular embodiment, the seller computing entity 110 may operate in accordance with multiple wireless communication standards and protocols, such UMTS, CDMA2000, 1xRTT, WCDMA, GSM<EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the seller computing entity 110 may operate in accordance with multiple wired communication standards and protocols, such as those described above with regard to the carrier platform 100 via a network interface 320.

Via these communication standards and protocols, the seller computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The seller computing entity 110 can also download changes, add-ons, and updates, for instance, to its firmware, software (e.g., including executable instructions, applications, program modules), and operating system.

According to one embodiment, the seller computing entity 110 may include location determining aspects, devices, modules, functionalities, and/or similar words used herein interchangeably. For example, the seller computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the seller computing entity's 110 position in connection with a variety of other systems, including cellular towers, Wi-Fi access points, and/or the like. Similarly, the seller computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The seller computing entity 110 may also comprise a user interface (that can include a display 316 coupled to a processing element 308) and/or a user input interface (coupled to a processing element 308). For example, the user interface may be a user/e-commerce application, browser, user interface, the like, and/or similar words used herein interchangeably executing on and/or accessible via the seller computing entity 110 to interact with and/or cause display of information/data from the carrier platform 100, as described herein. The user input interface can comprise any of a number of devices allowing the seller computing entity 110 to receive data, such as a keypad 318 (hard or soft), a touch display, voice or motion interfaces, or other input device. In embodiments including a keypad 318, the keypad 318 can include (or cause display of) the conventional numeric (0-9) and related keys (#, *), and other keys used for operating the seller computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The seller computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the seller computing entity 110. As indicated, this may include a user application that is resident on the entity or accessible through a browser or other user interface for communicating with the carrier platform 100, buyer computing entity 115, and/or various other computing entities.

In another embodiment, the seller computing entity 110 may include one or more components or functionality that are the same or similar to those of the carrier platform 100, as described in greater detail above. As will be recognized, these architectures and descriptions are provided for exemplary purposes only and are not limiting to the various embodiments.

3. Exemplary Buyer Computing Entity

A buyer (also referred to herein as a user) may be an individual, a family, a company, an organization, an entity, a department within an organization, a representative of an organization and/or person, and/or the like purchasing one or more items listed for sale through the carrier platform 100. In one embodiment, a buyer may operate a buyer computing entity 115 that includes one or more components that are functionally similar to those of the carrier platform 100 and/or the seller computing entity 110. For example, in one embodiment, each buyer computing entity 115 may include one or more processing elements, one or more display device/input devices (e.g., including user interfaces), volatile and non-volatile storage or memory, and/or one or more communications interfaces. For example, the user interface may be a user/e-commerce application, browser, user interface, the like, and/or similar words used herein interchangeably executing on and/or accessible via the buyer computing entity 115 to interact with and/or cause display of information/data from the carrier platform 100, as described herein. This may also enable the buyer computing entity 115 to communicate with various other computing entities, such as seller computing entities 110, and/or various other computing entities. As will be recognized, these architectures and descriptions are provided for exemplary purposes only and are not limiting to the various embodiments.

III. Exemplary System Operation

Reference will now be made to FIGS. 4A, 4B, 4C, 4D, 4E, 5-9, 10A, 10B, 11-20, 21A, 21B, and 22-24. FIGS. 4A, 4B, 4C, 4D, and 4E are flowcharts illustrating operations and processes that may be performed in accordance with various embodiments of the present invention. FIGS. 5-9, 10A, 10B, 11-20, 21A, 21B, and 22-24 are exemplary input and output that can be produced in accordance with various embodiments of the present invention.

1. Registration

In one embodiment, the process may be begin with sellers (e.g., operating seller computing entities 110) and/or buyers (e.g., operating buyer computing entities 115) accessing a carrier platform 100 to register for accounts, profiles, or similar words used herein interchangeably. As part of the registration process, a party (e.g., user, buyer, seller) can enter or provide biographic information, such as a given name, an entity name, phone numbers, messaging preferences, account numbers, shipping addresses, billing addresses, virtual addresses, carrier account numbers, date of birth, and/or the like. As will be recognized, such information/data may be entered by a user or form filler or pulled from other existing accounts, such as Facebook, Gmail, PayPal, Twitter, eBay, and/or the like. The parties can also provide financial information/data for making and/or receiving payments for transactions conducted through the carrier platform 100. As indicated, such payments may be in a variety of forms including via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like.

In one embodiment, sellers (e.g., operating seller computing entities 110) and/or buyers (e.g., operating buyer computing entities 115) may be required to accept certain terms and conditions provided by the carrier platform 100 (Block 400 of FIG. 4A) for accessing or using the carrier platform 100. The terms and conditions may include acceptance of published carrier rate charts, tables, and/or lists (see FIGS. 5 and 6). In one embodiment, the terms and conditions may be unique to the carrier platform 100 such that existing agreements with other services and/or carriers that are in force are not impacted (Block 403 of FIG. 4A). Thus, for example, any rate agreements with a carrier outside of the carrier platform 100 can remain in force outside of the platform. Further, because shipping rates can be dynamic, the carrier platform 100 shipping rates may change at any time. Responsive to such a change, the carrier platform 100 may notify the seller (e.g., via an appropriate application, browser, dashboard, or interface) of shipping charge adjustments and may provide an opportunity to "opt in" or reset the pricing of items through the carrier platform 100 (described in greater detail below). Similarly, the carrier can temporarily reduce shipping rates and notify the seller (e.g., via an appropriate application, browser, dashboard, or interface). For example, the carrier may discount air services to select dense areas on the East coast (e.g., New York City). Such a reduction may be profitable for a carrier by reducing, for example, overnight delivery pricing from $44 to $30 (provided there is sufficient cargo room) to incent buyers to request expedited delivery instead of one of the slower delivery service levels.

In one embodiment, once the carrier platform 100 receives the necessary biographic and/or financial information/data from the customer, the carrier platform 100 may perform one or more validation operations. For example, the carrier platform 100 may determine whether the provided addresses are valid, e.g., by passing them through one or more address cleansing or standardization systems. As will be recognized, a variety of other approaches and techniques can be used to adapt to various needs and circumstances.

In one embodiment, the carrier platform 100 may create a profile for each buyer or seller via the enrollment/registration process. Accordingly, the carrier platform 100 may create and store various user profiles. As will be recognized, each profile may be associated with access credentials (e.g., username, password, and/or the like) to carry out various transactions through the carrier platform 100. This approach can allow sellers to use the carrier platform 100 to sell items and/or create customized marketplaces.

2. Item Information

Figure 4A:
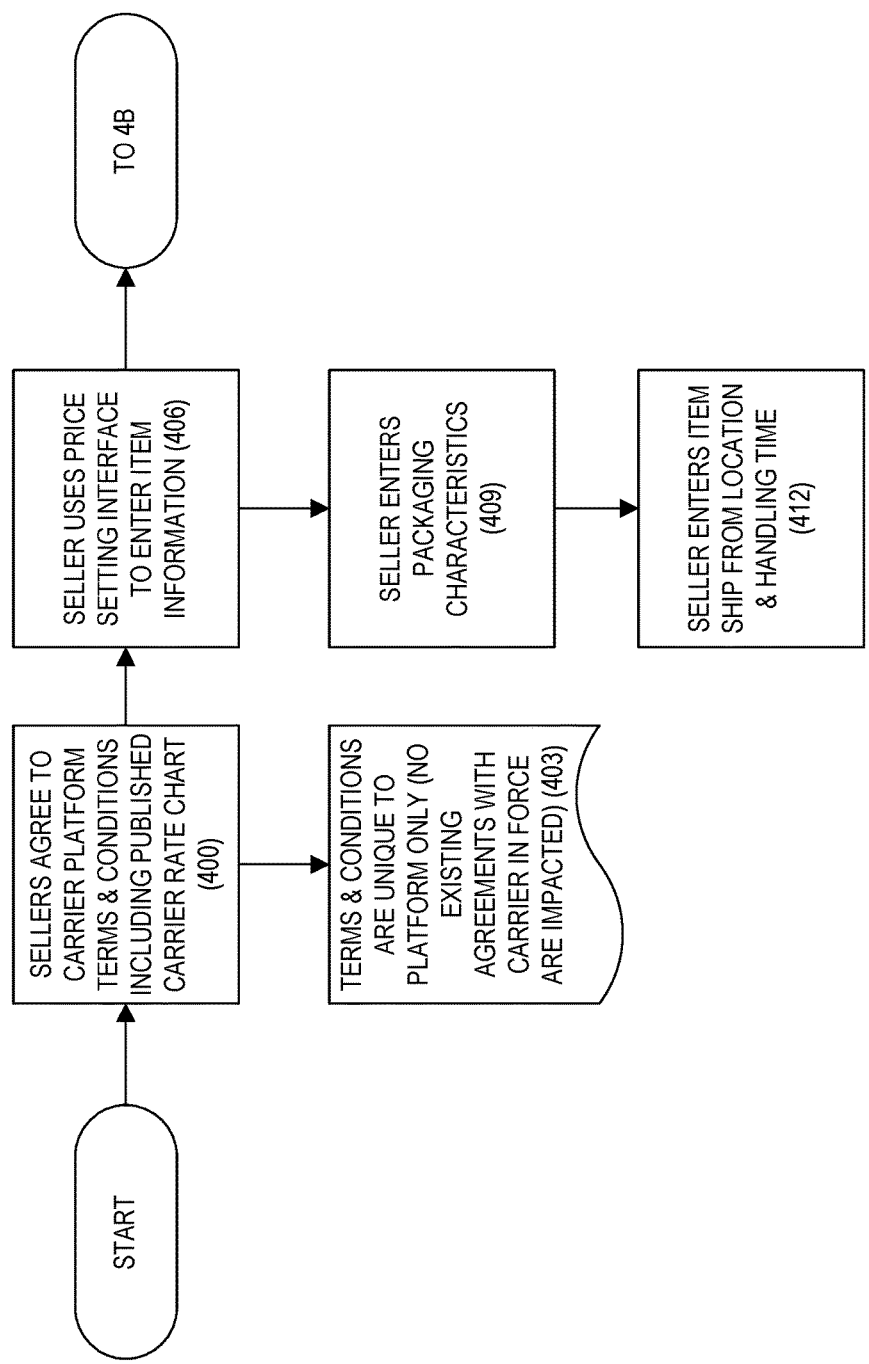

In one embodiment, before, after, or simultaneous to registration, a seller (e.g., operating a seller computing entity 110 through an appropriate application, browser, dashboard, or interface) can enter, input, provide, facilitate the provision of, and/or similar words used herein interchangeably various types of information/data for one or more items for sale (Block 406 of FIG. 4A). An item may be any tangible good that can be sold by a seller, shipped by a carrier, and/or purchased by a buyer. Certain of the following examples are described with an iPhone 4S being an item sold, purchased, and shipped. As will be recognized, this is provided as a non-limiting example to aid in understanding embodiments of the present invention. It is also described in the singular context, but a seller may list any number of items for sale and a buyer may purchase any number of items through the carrier platform 100. Similarly, as discussed in greater detail below, a single item may be represented as multiple items for sale.

As indicated in Block 409 of FIG. 4A, a seller (e.g., operating a seller computing entity 110) can provide item information/data. The item information/data may include various other types of data—including but not limited to packaging information/data, pricing information/data, location information/data, shipping information/data, condition information/data, and/or the like. With regard to the item information/data for an item being sold, the seller (e.g., operating a seller computing entity 110) can select or provide a title, name, description, identifier (e.g., stock keeping unit (SKU) number), composition, format and presentation, quality, condition (e.g., new, used, etc.), wear, damage, size, age or skill requirements, custom or stock photographs, color, dimensions (e.g., height, length, width, volume, etc.), weight, compatibility, and/or the like. A variety of other information/data can be used to describe an item being listed for sale to adapt various needs and circumstances. Also, for each unique item, feedback (e.g., customer reviews) may be accessed, collected, and/or stored in association with an item description or item/shipment identifier. As will be recognized, such feedback may be from the same item sold by multiple sellers or a single seller.

As noted, in addition to item information, the seller (e.g., operating a seller computing entity 110) can also provide packaging information. Packaging information/data may include packaging details, such as interior cushioning information, product placement information, exterior carton information, closure information, and shipping label placement information. The packaging information/data may also include the dimensions and weight of the packaging and/or the combined or aggregate dimensions and weight of the packaged item. Such concepts are described in greater detail in U.S. Pat. Nos. 8,073,753 and 8,438,088, which are hereby incorporated in their entireties by reference. Further, the packaged item or items may be shipped as or in one or more packages, parcels, bags, containers, loads, crates, pallets, drums, the like, and/or similar words used herein interchangeably. Continuing with the above example, the packaging information/data may be provided for the packaged dimensions and weight for the iPhone 4S for sale through the carrier platform 100, for instance.

Once the item information/data has been received by the carrier platform 100, the carrier platform 100 can store the item information/data in association with the corresponding seller's profile as an item for sale. As will be recognized, a variety of other approaches and techniques can be used to adapt to various needs and circumstances.

3. Handling, Shipping, and Pricing Information

Figure 4B:
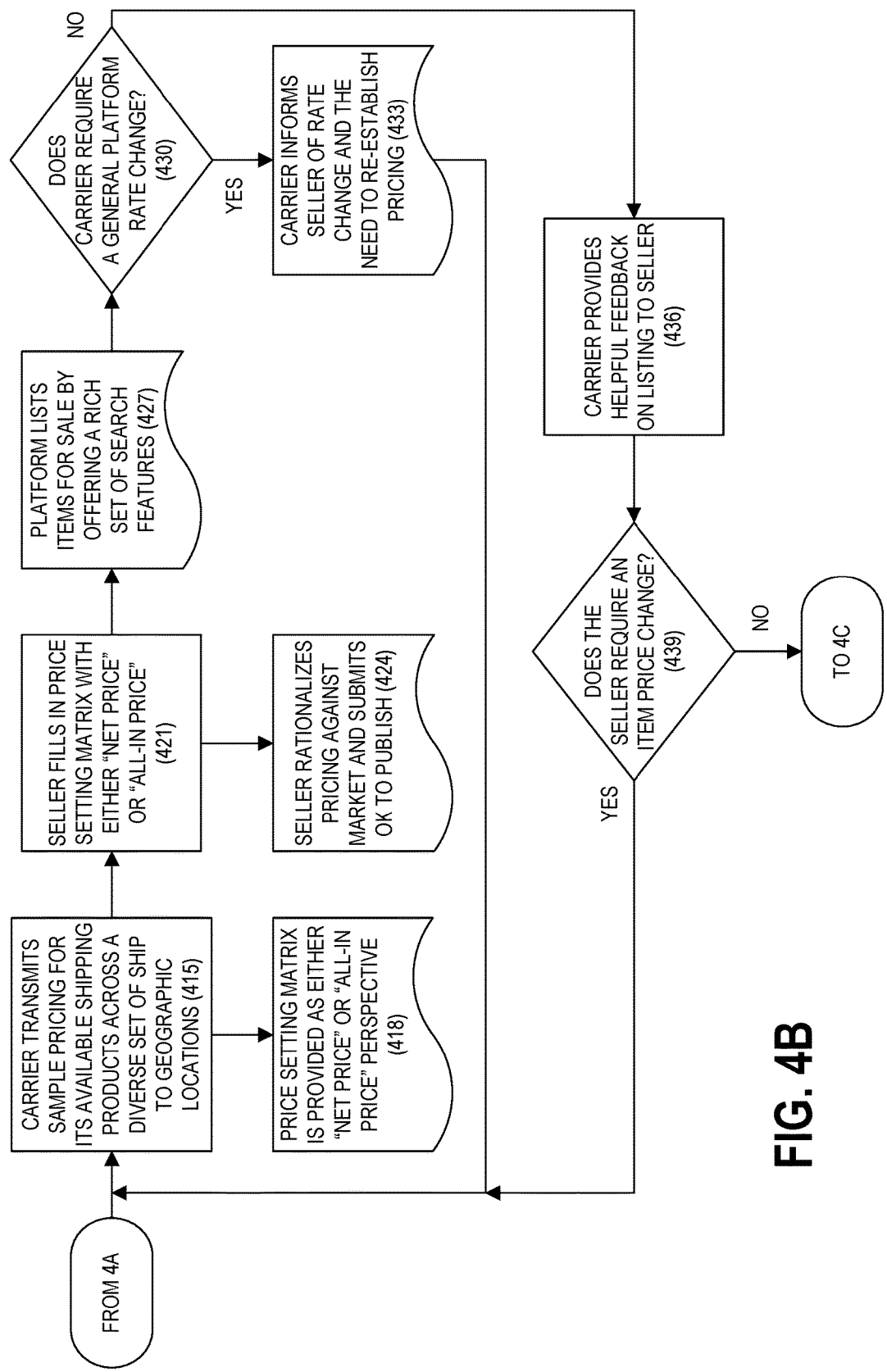

In one embodiment, the seller (e.g., operating a seller computing entity 110 through an appropriate application, browser, dashboard, or interface) can also enter and/or provide handling information, shipping information, and/or pricing information/data for each item being sold—Blocks 412, 415, 418, 421, and 424 of FIGS. 4A and 4B. Certain examples used herein are provided in the context of the seller being established in or having a ship-from address in Spokane, Wash. As will be recognized, this is a non-limiting example used to aid in understanding embodiments of the present invention.

As will be described, in one embodiment, each individual item being sold may include handling information, shipping information, and/or pricing information/data for each possible delivery/destination zone, zip code, metropolitan area, state, geographic area, and similar words used interchangeably to which the item could be delivered after being purchased. As will be recognized, carriers often use zones, zip codes, metropolitan areas, states, geographic areas, and the like to determine the applicable shipping charges for transporting an item through the carrier's transportation and logistics network. For instance, the physical ship-from address (the address, point, or location from where the item will be shipped) and the physical ship-to address (the address, point, or location to where the item will be shipped) may be associated with different zones, zip codes, metropolitan areas, states, geographic areas, and/or the like. Accordingly, under certain circumstances, the shipping charges and times in transit may vary based on the ship-from and ship-to locations. For example, an item with a ship-from address in Spokane, Wash., and ship-to address Atlanta, Ga., may have different shipping rates and transit times than an item with a ship-from address in Spokane, Wash., with a ship-to address in Seattle, Wash. To account for such differences, a seller may want to provide different handling information, shipping information, and/or pricing information/data for each possible delivery/destination zone to which the item can be shipped. That is, the handling information, shipping information, and/or pricing information/data for an individual item may vary based on the potential delivery destinations. In one embodiment, the carrier platform 100 can impose geographic restrictions on e-commerce transactions, such as limiting e-commerce transactions to a particular time zone, country, geographic area, and/or the like. This may serve to limit the number of possible permutations for selling an item.

Operatively, with the packaged dimensions and weight of an item, the seller (e.g., operating a seller computing entity 110) may simply input that the item should delivered to the various delivery/destination zones within a specified time period (e.g., two days) and a desired net price and the carrier platform 100 can populate recommended handling information, shipping information, and pricing information/data for acceptance by the seller. In another embodiment, the seller (e.g., operating a seller computing entity 110) can input the handling information, shipping information, and/or pricing information/data for each potential delivery/destination zone, zip code, metropolitan area, state, geographic area, and/or the like to which the seller may ship the item. To input or provide such information, a seller (e.g., operating a seller computing entity 110) can view the time in transit and shipping charges to deliver the item to different zones by accessing the rate tables shown in FIGS. 5-7. In this example, FIG. 7 provides illustrative time-in-transit days and shipping charges for shipping an item from Spokane, Wash., to Seattle, Wash.; to San Francisco, Calif.; to Denver, Colo.; to Kansas City, Mo.; and to Atlanta, Ga. This information/data can provide the seller with information/data to competitively and strategically determine and/or provide handling information, shipping information, and/or pricing information/data for an item to be sold via the carrier platform 100. Continuing with the above example, this approach can allow the seller (e.g., operating a seller computing entity 110) to provide handling information, shipping information, and/or pricing information/data for selling the item with a final delivery point in Seattle, Wash.; San Francisco, Calif.; Denver, Colo.; Kansas City, Mo.; or Atlanta, Ga. In other words, the seller can customize the handling information, shipping information, and/or pricing information/data for the item based on destination to which the item may be delivered to be more strategic and competitive with other sellers in the market that may be in geographically distinct areas—examples of which are described in greater detail below.

With regard to the handling information, a seller (e.g., operating a seller computing entity 110) can provide a committed handling time for shipping an item. The committed handling time may be the number of days (e.g., business days—normal weekdays, days of the week, and/or the like) the seller will take to ship the item after the order has been received or after payment for the item has been cleared, which may be immediate or take a few days depending on the type of payment. This committed handling time can take into account the seller's access to the item, scheduling issues, packaging considerations, possible combination with other items, and/or the like. For a single item, then, the seller (e.g., operating a seller computing entity 110) may provide a handling time for each zone to which the item could potentially be delivered. Continuing with the above example, a seller (e.g., operating a seller computing entity 110) may provide a committed handling time for shipping an iPhone 4S to buyers in various potential delivery/destination zones: (1) one day handling time for deliveries from Spokane, Wash., to Seattle, Wash.; (2) one day handling time for deliveries from Spokane, Wash., to San Francisco, Calif.; (3) one day handling time for deliveries from Spokane, Wash., to Denver, Colo.; (4) same day handling time for deliveries from Spokane, Wash., to Kansas City, Mo.; and (5) same day handling time for deliveries from Spokane, Wash., to Atlanta, Ga. In another embodiment, the carrier platform 100 may provide such recommendations to the seller for acceptance based on a two-day delivery goal input by the seller. Regardless of the source of the input or selection, a single item may be associated with multiple handling times based on the potential delivery/destination zones. Even further, a seller may offer multiple handling times for a given delivery/destination zone. Thus, such handling times can be stored in association with an item for sale by the carrier platform 100.

With further regard to handling times, the carrier platform 100 can provide a metric for display to buyers to differentiate sellers from one another: a "handling score." The handling score may be the difference between committed handling times and actual handling times for items sold/purchased through the carrier platform 100. This metric can be used to hold sellers accountable to their handling time commitments, while not reflecting seller handling delays on the carrier. High handling scores may lead to buyers gravitating to sellers with high handling scores and/or consistently minimal handling times. As will be recognized, handling scores may be calculated, generated, determined, the like, and/or similar words used herein interchangeably by the carrier platform 100 in a variety of ways. For example, in one embodiment, a handling score for a seller can be determined by dividing the number of times the seller has met the committed handling times by the total number of transactions. Thus, if a seller has completed 202 sales/transactions and met the committed handling time on 182 of those sales/transactions, the handling score for the seller would be 91%. In another embodiment, a delay penalty can be imposed on the handling score based on the total amount of delay. For instance, for delays in the handling time greater than a configurable threshold (e.g., one day), the carrier platform 100 can determine a delay penalty and subtract the delay penalty from the handling score (also referred to as a batting average in the corresponding figures) for sellers that had delays exceeding the configurable threshold. By way of example, after calculating the average number of days late (per missed commitment), a logarithm can be applied (to adjust for unusual events) and an adjustment made to reduce the magnitude by x10, for instance, with the resulting percentage being the delay penalty. The carrier platform 100 can then subtract the delay penalty from the handling score (see FIGS. 10A, 10B, and 11). Handling scores and/or delay penalties can be updated regularly, periodically, continuously, and/or in response to certain triggers (e.g., processing a transaction or receiving shipment of an item). For example, a seller's overall handling score can be updated nightly or after the appropriate data for a transaction is received or made available to the carrier platform 100. The handling score can be stored for display in association with a seller's account or profile. As will be recognized, a variety of other approaches and techniques can be used to adapt to various needs and circumstances.

In one embodiment, the seller (e.g., operating a seller computing entity 110) can provide shipping information/data for shipping an item. The shipping information/data may include buyer/consignee information/data and/or seller/consignor information/data (see FIG. 12). The shipping information/data may also include the delivery service level and time in transit associated with delivering the item to delivery points/locations in the zones, zip codes, metropolitan areas, states, and/or geographic areas. A delivery service level may be Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. And the time in transit may be the number of days for the carrier to deliver the item to its destination based on the corresponding delivery service level. Further, for a single item, the seller (e.g., operating a seller computing entity 110) may provide a shipping information/data for each zone to which the item could potentially be delivered. Continuing with the above example, a seller (e.g., operating a seller computing entity 110) may provide shipping information/data for shipping an iPhone 4S to buyers in various potential delivery/destination zones: (1) Ground for deliveries from Spokane, Wash., to Seattle, Wash.; (2) Ground for deliveries from Spokane, Wash., to San Francisco, Calif.; (3) 2nd Day Air for deliveries from Spokane, Wash., to Denver, Colo.; (4) 2nd Day Air for deliveries from Spokane, Wash., to Kansas City, Mo.; and (5) 2nd Day Air for from Spokane, Wash., deliveries to Atlanta, Ga. This may allow the seller (e.g., operating a seller computing entity 110) to reduce shipping costs by using different delivery service levels based on the delivery/destination zones to which the item may be delivered but have the same delivery time. For example, a seller in Spokane, Wash., can ship the item via Ground to meet a two-day or even one-day arrival commitment for a buyer in Seattle, Wash. However, the same seller may need to ship the same item via 2nd Day Air or Next Day air to meet the same two-day commitment for a buyer in Atlanta, Ga. FIGS. 7-8 show exemplary differences in times in transit based on delivery service levels to various ship-to zones. As has been shown, a single item may be associated with multiple delivery service levels based on the potential delivery/destination zones. Moreover, a seller may offer multiple delivery service levels for a given delivery/destination zone. Such delivery service levels can be stored in association with an item for sale by the carrier platform 100. Further, the carrier platform 100 can determine the total days until arrival for each combination of committed handling times and delivery service levels for an item. As will be recognized, a variety of other approaches and techniques can be used to adapt to various needs and circumstances.

In addition to the handling and shipping information, the seller (e.g., operating a seller computing entity 110) can provide pricing information/data for an item. The pricing information/data may include a net price (e.g., excluding shipping costs and taxes) or a total price (e.gl, inclusive of shipping costs and taxes). These may be provided by the seller (e.g., operating a seller computing entity 110) or automatically generated by the carrier platform 100 (Block 415 of FIG. 415 of 4B). Further, the pricing information/data (e.g., net price and/or total price) may vary and be provided for each zone to which the item could potentially be delivered as a result of the sale. Continuing with the above example, a seller (e.g., operating a seller computing entity 110) may provide a net price for selling an iPhone 4S to buyers in various potential delivery/destination zones: (1) net sale prices ranging from $228-$234 depending on the delivery service level for deliveries from Spokane, Wash., to Seattle, Wash.; (2) net sale prices ranging from $226-$236 depending on the delivery service level for deliveries from Spokane, Wash., to San Francisco, Calif.; (3) net sale prices ranging from $224-$236 depending on the delivery service level for deliveries from Spokane, Wash., to Denver, Colo.; (4) net sale prices ranging from $222-$226 depending on the delivery service level for deliveries from Spokane, Wash., to Kansas City, Mo.; and (5) net sale prices ranging from $220-$235 depending on the delivery service level for deliveries from Spokane, Wash., to Atlanta, Ga. In certain embodiments, the net prices and total prices (also referred to as the "all-in" prices) can be stored in association with the item. The all-in price may include shipping costs, taxes, and/or the cost of the item. As has been shown, a single item may be associated with multiple prices based on the potential delivery/destination zones. Moreover, a seller may offer multiple prices for a given delivery/destination zone. Such prices can be stored in association with an item for sale by the carrier platform 100. As will be recognized, a variety of other approaches and techniques can be used to adapt to various needs and circumstances.

Figure 13:
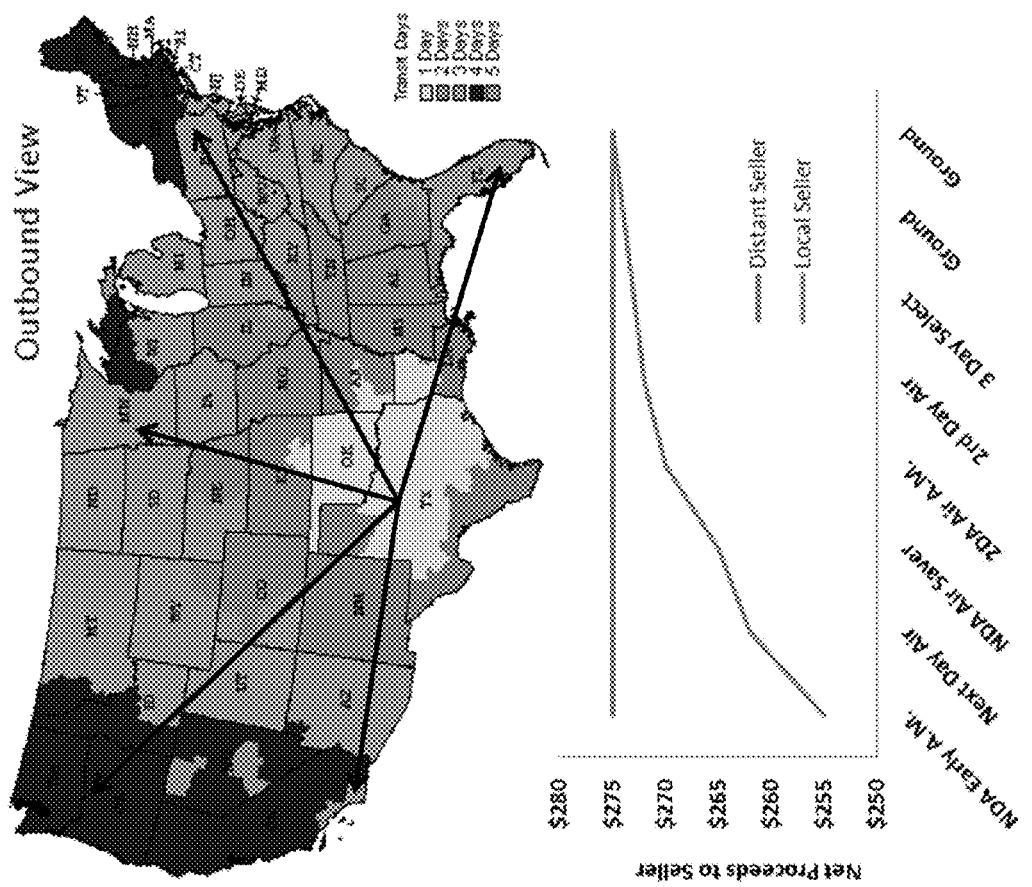

As shown in FIG. 13, as a trade-off to warehousing goods and paying for fulfillment services, sellers can compete for business by reducing net pricing for more distant buyer destination or delivery points. For instance, a seller in Dallas, Tex., can compete more effectively against a seller in Miami, Fla., by reducing the net price on an expedited air services transaction and/or to account for differences in taxes on the transactions. Thus, with the reduced net pricing, the buyer (e.g., operating a buyer computing entity 115 through an appropriate application, browser, dashboard, or interface) will see comparable pricing and delivery times from both sellers in distinct geographic locations. Similarly, such roles may be reversed when the buyer is located in Dallas, Tex.: the seller in Miami, Fla., might consider the same strategy of upgrading the delivery service level and handling time and reducing the net price to better compete with the seller in Dallas, Tex.

4. Listing Items for Sale

As has been described, each item being sold may be associated with multiple handling times, delivery services levels, and prices. The different handling times, delivery services levels, and prices may be based on the potential delivery destinations or zones. This approach may allow the seller to customize each item to sell the item at a competitive cost based on the end destinations or delivery points while maximizing profit and delivery times.

In one embodiment, after input of the appropriate information/data and/or approval or submission by a seller (e.g., operating a seller computing entity 110), the carrier platform 100 can list, make accessible or searchable, publish, the like, and/or similar words used herein interchangeably the item for purchase by buyers (Block 427 of FIG. 4B). After being published, the carrier platform 100 can provide a rich set of searching or browsing features for viewing items for sale. Thus, buyers (e.g., operating buyer computing entities 115) can browse, search, sort, and filter items available for purchase via the carrier platform 100.

In one embodiment, to begin viewing items for sale, a buyer (e.g., operating a buyer computing entity 115) may be required to enter the destination or delivery point of an item being purchased for the carrier platform 100 to provide the appropriate information. For example, as previously described, prices, handling, and shipping information/data may vary based on final destinations or delivery points. In another embodiment, the carrier platform 100 (in communication with the buyer computing entity 115) can automatically detect the buyer's current location using GPS, triangulation, accessing the buyer's account/profile, or resolving the appropriate Internet Protocol (IP) address. In one embodiment, if automatically determined, the buyer computing entity 115 (in communication with the carrier platform 100) can ask the buyer to confirm that the determined delivery destination of an item is correct.

With the potential delivery destination, a buyer (e.g., operating a buyer computing entity 115 in communication with the carrier platform 100) can search or browse for items. For example, a buyer (e.g., operating a buyer computing entity 115) can search for an iPhone 4S by using, for example, the search terms of iPhone or 4S. In another embodiment, the buyer (e.g., operating a buyer computing entity 115 through an appropriate application, browser, dashboard, or interface) can navigate to the appropriate area to view the iPhone 4S devices for sale via the carrier platform 100.

Figure 14:
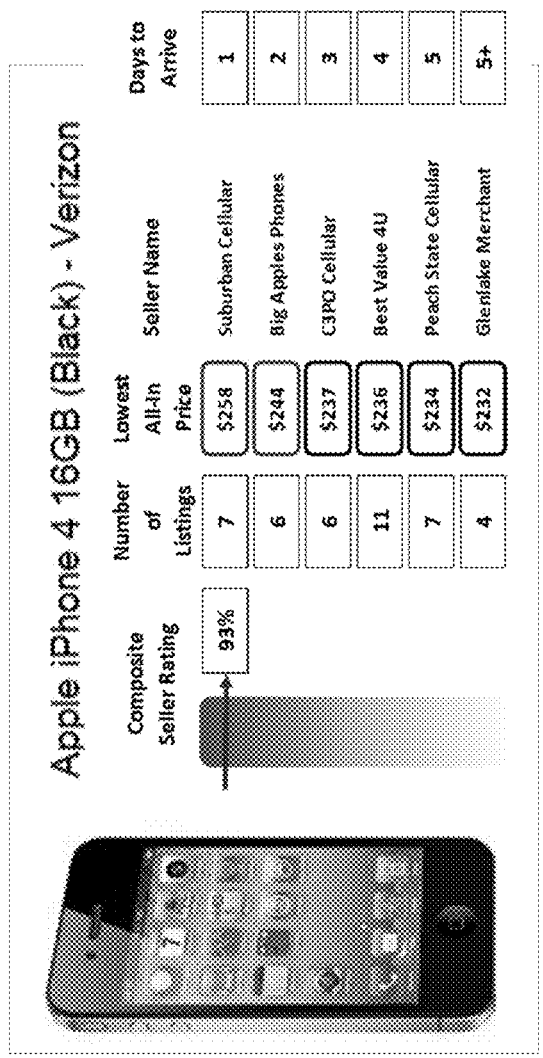
Figure 15:
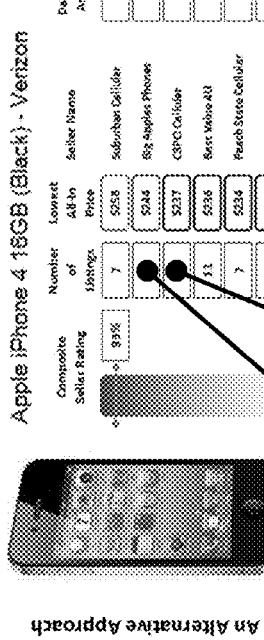

In one embodiment, in response to such a search or a user navigating to an appropriate area, the carrier platform 100 can provide the corresponding items for sale to the appropriate computing entity (e.g., buyer computing entity 115) for display. FIGS. 14-19 show different views that can be presented for items being sold through the carrier platform 100. For example, as shown in FIG. 14, the carrier platform 100 (e.g., in communication with seller computing entities 110, buyer computing entities, and/or the like) can identify the appropriate items and corresponding item information, product information, handling information, shipping information, and price information. With the appropriate items and corresponding information/data identified, the carrier platform 100 can group the listings by price or price ranges, by handling times, by days in transit, by seller rating (the seller rating may be a combination of handling and user ratings), by handling scores, and/or the like. For instance, FIG. 14 shows a grouping of iPhones by the lowest all-in price: (1) 7 listings at $258; (2) 6 listings at $244; (3) 3 listings at $237; (4) 7 listings at $236; (5) 7 listings at $234; and (6) 4 listings at $232. Such information/data can be provided to and displayed to the buyer (e.g., operating a buyer computing entity 115 through an appropriate application, browser, dashboard, or interface). The results can change dynamically as the buyer (e.g., operating a buyer computing entity 115) adjusts the sliding scale. Further, a buyer (e.g., operating a buyer computing entity 115) can select a listings box to view all listings associated with the delivery time that meet the specified seller rating criteria. A buyer (e.g., operating a buyer computing entity 115) can also select the all-in prices to view the corresponding items for sale. Such selections can cause display of an expanded view of the listings. FIG. 15, for instance, shows the expansion of the listing for iPhones with 2 days to arrive at the delivery point and 3 days to arrive at the delivery point. In this particular example, the listings appear for all sellers with a rating of 93% or better that are able to meet the specified arrival time—such as 2 or 3 days.

Figure 16:
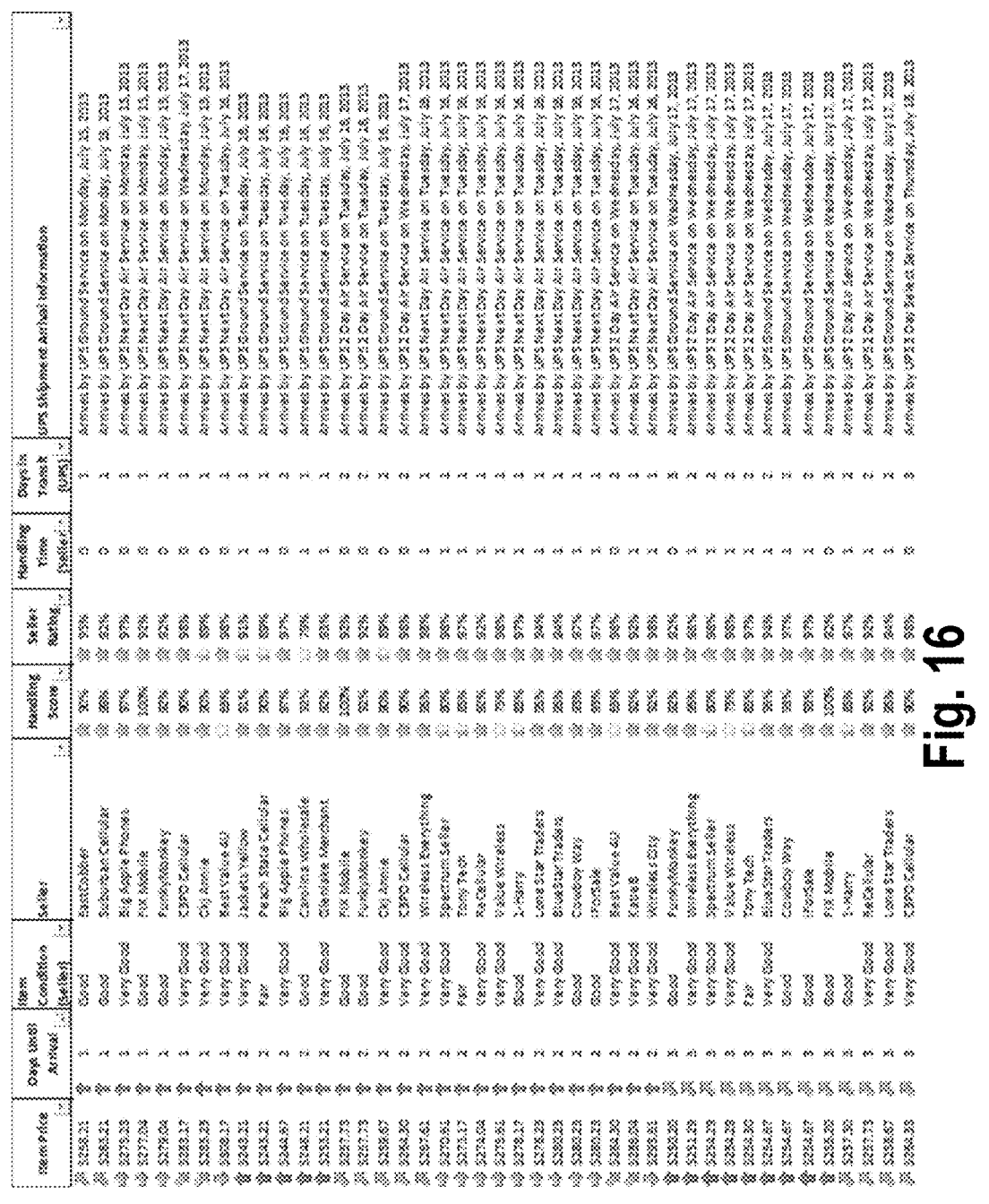
Figure 18:

FIGS. 16 and 17 show embodiments in which a buyer (e.g., operating a buyer computing entity 115) can view listings of items for sale as individual listings. The listings may include item information, packaging information, handling information, shipping information, and price information. Further, the listings can be sorted or filtered based on various criteria, such as item price, days until arrival, item condition, quality, seller name, handling score, seller rating (which may be based in part on the handling score), committed handling time, delivery service level, and/or in a variety of other ways not shown. Further, as shown in FIG. 18, by applying filters, buyers may be able to eliminate variability in seller handling times while selecting sellers with the best reputations. As an example, Big Apple Phones (New York, N.Y.) may compete with Wireless Everything (Salt Lake City, Utah) for business. A potential buyer of a used iPhone 4S can "mouse over" the item condition information/data to view additional details about the item. Big Apple Phone might consider "Very Good" condition as "Lots of scratches. Back plastic has small cracks, doesn't affect function of the phone!" But, Wireless Everything may consider "Very Good" condition as "Looks really good! No major scratches or cracks. Fully functional as well!" The buyer might then decide to buy an iPhone from Wireless Everything phone for $251.29 that takes 3 days to arrive. In another embodiment, standardized conditions descriptions may be used to adapt to various needs and circumstances.

Figure 20:
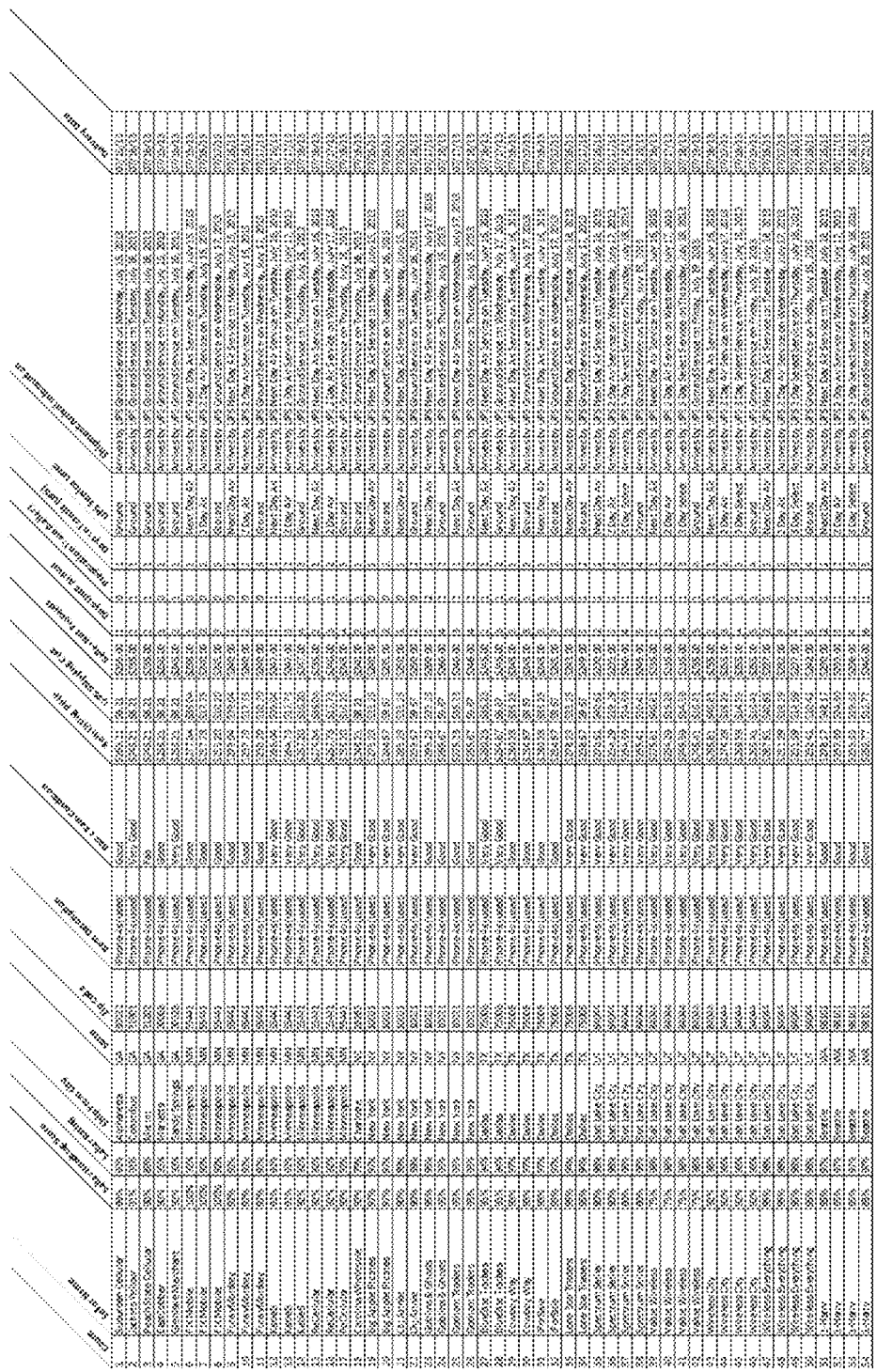

As shown in FIG. 19, by scoring and displaying seller handling commitments and handling scores, sellers are incented to expedite handling times and to meet their handling commitments. For instance, Big Apple Phones (New York, N.Y.) is in a favorable position to compete with both Jackets Yellow (Columbus, Ga.) and Peach State Cellular (Macon, Ga.) because of its same day handling and high handling score. FIG. 20 shows additional information/data that can be stored in association with each item, but is not necessarily displayed. As will be recognized, this may only be a portion of the information/data stored in association with each item.

In one embodiment, for each unique combination of handling information, shipping information, and price information, the carrier platform 100 can cause for the same to be displayed to buyers (e.g., operating buyer computing entities 115) as separate listings even though they may be for the same item. For instance, the four iPhones listed as being sold by Wireless Everything in FIG. 17 may actually be for the same iPhone with different handling, shipping, and price options. This approach allows buyers to view and understand the true all-in prices for the item with the different handling commitments, delivery service levels, and/or the like for an individual item. In FIG. 17, the same may be true for the iPhones sold Big Apple Phones, Giant Phones, Gotham Traders, Trader Tommy, and Goblins and Ghosts. This is a more comprehensive detailed view of the different prices available—provided the buyer is willing to use or allow for different handling times or delivery service levels. As will be recognized, a variety of other approaches and techniques can be used to adapt to various needs and circumstances. As a helpful guide for buyers, directional arrows have been placed next to item price and days until arrival. Due to filtering by the buyer, a subset of information/data may be displayed—such as s handling score greater than or equal to 95%. The directional arrows reflect a ranking within the entire set (not just the subset). A mathematical calculation can be applied to the entire set in order to determine an overall rank. In FIG. 17, an up arrow reflects a positive to the buyer, such as a low item price or fewer days until arrival. For example, Wireless Everything offers an iPhone at an attractive price of $252.41 (up arrow) with a less attractive days until arrival of 5 (downward arrow).

In one embodiment, the carrier platform 100 can regularly, periodically, or continuously determine whether there has been a general platform rate change for delivery services (Block 430 of FIG. 4B). If a rate change has occurred, the carrier platform can notify the appropriate sellers (e.g., operating seller computing entities 110) of the rate change so the sellers can determine if they want to update handling, shipping, and/or pricing information/data as has been previously described (Block 433 of FIG. 4B). Further, the carrier platform can provide helpful feedback on listings to sellers, which may lead to sellers adjusting handling, shipping, and/or pricing information/data (Blocks 436 and 439 of FIG. 4B). Based upon customer feedback the carrier may collect from buyers (and sellers), shipping trends the carrier identifies, and e-commerce analytics such as "items purchased," "price paid," "add to cart," "abandoned carts," "conversion rate," "product page views," and "best product SKU" to name a few, sellers may request that the carrier offer advice relating to item price and shipping choice. In FIG. 16, the carrier identifies that the seller Best Value 4U has a 65% handling score and recommends the seller adjust its handling commitment or make improvements. In FIG. 17, the carrier does not record any interest in any of the listings presented by Trader Tommy and recommends the seller take steps toward attracting buyers.

Figure 4C:
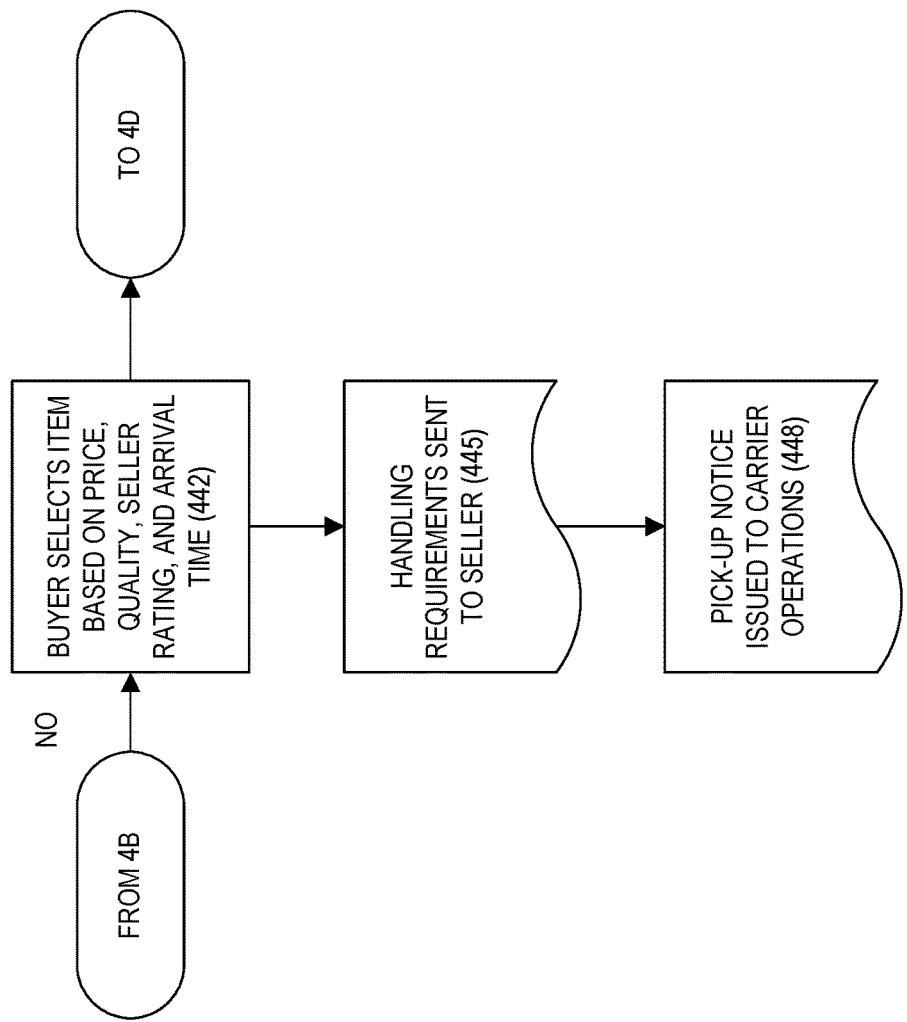

In one embodiment, after the buyer (e.g., operating a buyer computing entity 115) selects an item to purchase, the buyer (e.g., operating a buyer computing entity 115 in communication with the carrier platform 100) can complete the checkout process (Block 442 of FIG. 4C). The checkout process can be completed using known techniques for providing the buyer's biographic and financial information/data for completing the transaction and shipping the item to the buyer. As part of the checkout process, the buyer (e.g., operating a buyer computing entity 115 in communication with the carrier platform 100) can be presented with different shipping options. For instance, as shown in FIG. 22, based upon the carrier's time in transit, the carrier products can be presented to the buyer—including options to upgrade to premium services, provide delivery instructions, or messaging preferences (see FIG. 21B). Continuing with the above example, if the buyer selects an item with a two-day arrival time with same day handling via Ground, the buyer (e.g., operating a buyer computing entity 115 in communication with the carrier platform 100) can be presented with options to upgrade the service level, such as upgrading to Next Day Air or 2 Day Air A.M. As will be recognized, a variety of other services and products can be offered to buyers as part of the checkout process or during other parts of the transaction.

After a buyer (e.g., operating a buyer computing entity 115) purchases an item, the carrier platform 100 can provide the transaction information/data (including the appropriate committed handling time) to the corresponding seller (e.g., operating a seller computing entity 110)—Block 445 of FIG. 4C. Before, after, simultaneous to packaging or otherwise preparing the item for shipment, an appropriate computing entity (e.g., the seller computing entity 110 and/or carrier platform 100) can provide a pick-up notice to the carrier platform 100 (Block 448 of FIG. 4C). Each packaged item may include an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. The unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein.

Figure 4D:
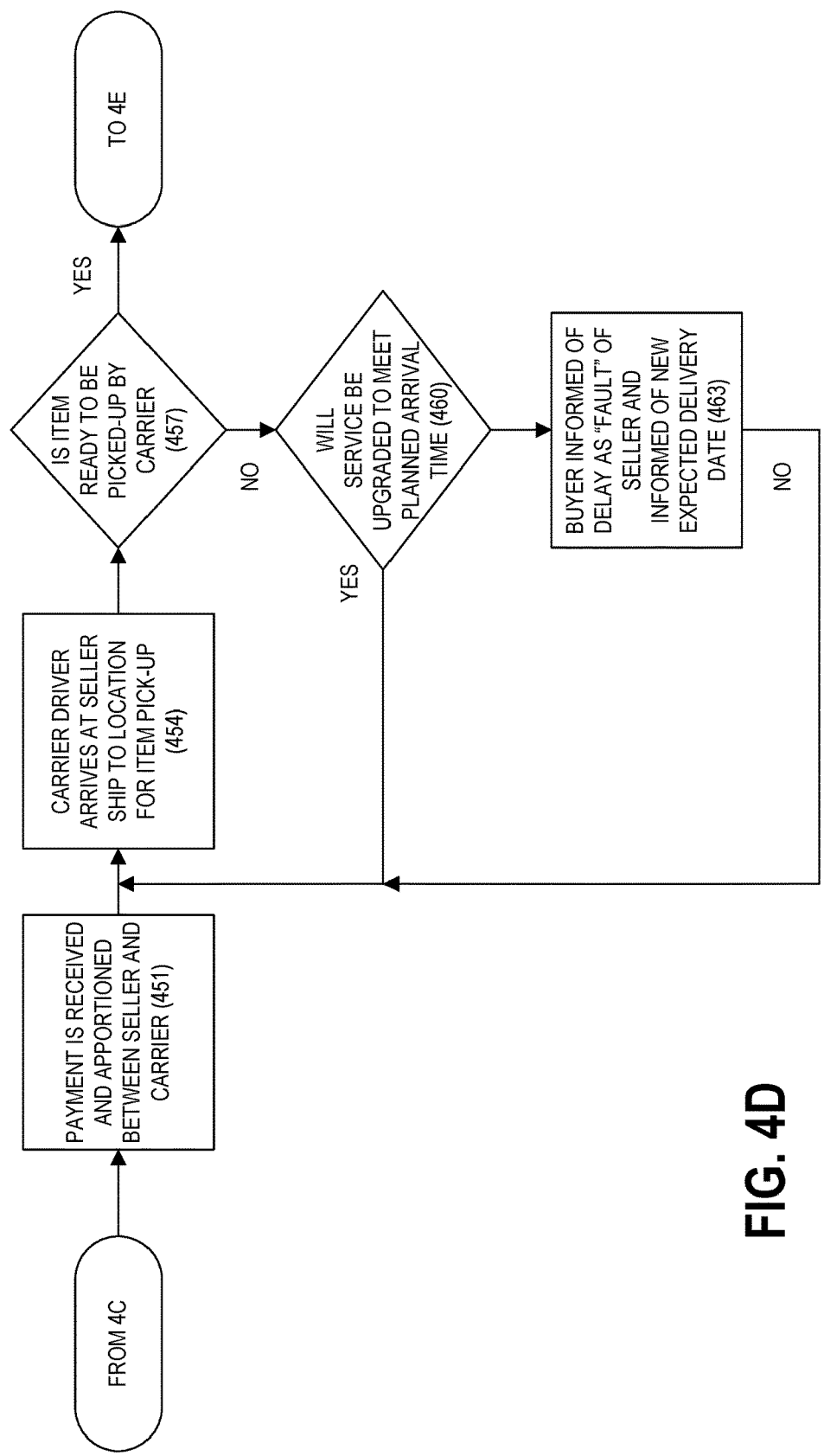

As indicated in Blocks 451, 454, and 457 of FIG. 4D, payment can be received and apportioned between seller and carrier and carrier personnel can pick up the item from the seller for ingestion into the transportation and logistics network. In one embodiment, after ingestion into the carrier's transportation and delivery network, carrier personnel can scan the item/shipment identifier on the item, and the carrier platform 100 can determine whether the seller has met the corresponding handling time commitment and update the seller's handling score and/or seller rating appropriately. In certain embodiments, if the seller has not met the corresponding handling time commitment, the delivery service level can be upgraded by the carrier to satisfy delivery within the anticipated arrival estimate (e.g., days until arrival)—regardless of the seller not meeting the handling time commitment.

5. Upgrading Delivery Service Levels

As noted, if the seller has not met the corresponding handling time commitment for an item, the delivery service level can be manually or automatically upgraded to meet the anticipated arrival estimate—regardless of the seller not meeting the handling time commitment (Blocks 460 and 463 of FIG. 4D). Similar upgrade concepts are described in U.S. Publ. Appl. No. 2012-0303541 which is hereby incorporated in its entirety by reference. In one embodiment, the carrier platform 100 can notify the seller (e.g., operating a seller computing entity 110 through an appropriate application, browser, dashboard, or interface) that the committed handling time was not met and provide the seller with the opportunity to upgrade the delivery service level to satisfy the delivery anticipated arrival estimate. The seller (e.g., operating a seller computing entity 110 through an appropriate application, browser, dashboard, or interface) may provide input changing the delivery service level the item (e.g., change the delivery service level from Ground to 2nd Day Air) to meet the original estimated days until arrive—see FIG. 21A. After (e.g., in response to) the carrier platform 100 receives the request to change the delivery service level, the carrier platform 100 can confirm the appropriate information/data via the interface (e.g., browser, dashboard, application) to the user. As will be recognized, this service may require an additional fee for the upgraded delivery service level and/or a transaction fee. As a result, the delivery service level can be changed from a first delivery service level with which it was originally shipped to a second delivery service level (e.g., changing the service level from Ground to Next Day Air).

After (e.g., in response to) receiving such a request, the carrier platform 100 can accept the requested changes and update the shipping information/data to reflect that the item should be delivered in accordance with the second (e.g., changed) delivery service level. In one embodiment, the change in the delivery service level may require applying a new item/shipment identifier and/or label. Thus, carrier personnel sorting items or loading delivery vehicles can scan an item/shipment identifier (e.g., using a mobile device) on an item to view information/data about the delivery of the item, and the updated shipping information/data (or at least a portion of updated shipping information) can be displayed. The updated shipping information/data may indicate that a new label (and/or item/shipment identifier) needs to be affixed to the item (e.g., the new label may indicate the new delivery service level). The item can then be transported and delivered with the new label by the carrier in accordance with the second (e.g., changed) delivery service level.

In another embodiment, the seller (e.g., operating a seller computing entity 110 through an appropriate application, browser, dashboard, or interface) can set the delivery service level of certain items to be automatically upgraded when committed handling times are not met. Or, the seller can set all items associated with the seller's profile to be automatically upgraded when committed handling times are not met. For example, the seller (e.g., operating a seller computing entity 110 through an appropriate application, browser, dashboard, or interface) may select an automatic service upgrade feature via the seller's profile for all (or select) items to be delivered that do not meet the committed handling time to be upgraded. Further, the seller may provide parameters associated with the automatic upgrades, such as only automatically upgrading one service level or automatically upgrading to meet the originally estimated days until arrival. As will be recognized, a variety of other approaches and techniques can be used to adapt to various needs and circumstances.

In one embodiment, the carrier platform 100 can receive the request to automatically change the delivery service level as input from the user. After (e.g., in response to) receiving such a request, the carrier platform 100 can accept the requested changes (e.g. including validating the changes). The carrier platform 100 can then update the seller profile to reflect that items that have not met the committed handling time should be automatically upgraded in accordance with the seller's profile.

In one embodiment, the carrier platform 100 can determine and notify the seller (e.g., operating a seller computing entity 110 through an appropriate application, browser, dashboard, or interface) that the committed handling time was not met and automatically upgrade the delivery service level in accordance with the seller's profile. The carrier platform 100 can then update the shipping information/data to reflect that the item should be delivered in accordance with the second (e.g., changed) delivery service level. In one embodiment, the automatic change in the delivery service level may require applying a new item/shipment identifier and/or label. Thus, carrier personnel sorting items or loading delivery vehicles can scan an item/shipment identifier (e.g., using a mobile device) on an item to view information/data about the delivery of the item, and the updated shipping information/data (or at least a portion of updated shipping information) can be displayed. The updated shipping information/data may indicate that a new label (and/or item/shipment identifier) needs to be affixed to the item (e.g., the new label may indicate the new delivery service level). The item can then be transported and delivered with the new label by the carrier in accordance with the second (e.g., changed) delivery service level.

In one embodiment, this may allow for the item to be delivered on time as initially estimated during the purchase transaction and allow for sellers to maintain positive relationships with buyers regardless of missing handling time commitments. Further, in one embodiment, for sellers who upgrade the delivery service level for the item to be delivered on time as initially estimated after missing the committed handling time, the carrier platform 100 may not penalize the seller's handling score for missing the committed handling time. As will be recognized, a variety of other approaches and techniques may be used to adapt to various needs and circumstances.

6. Delivery

Figure 4E:
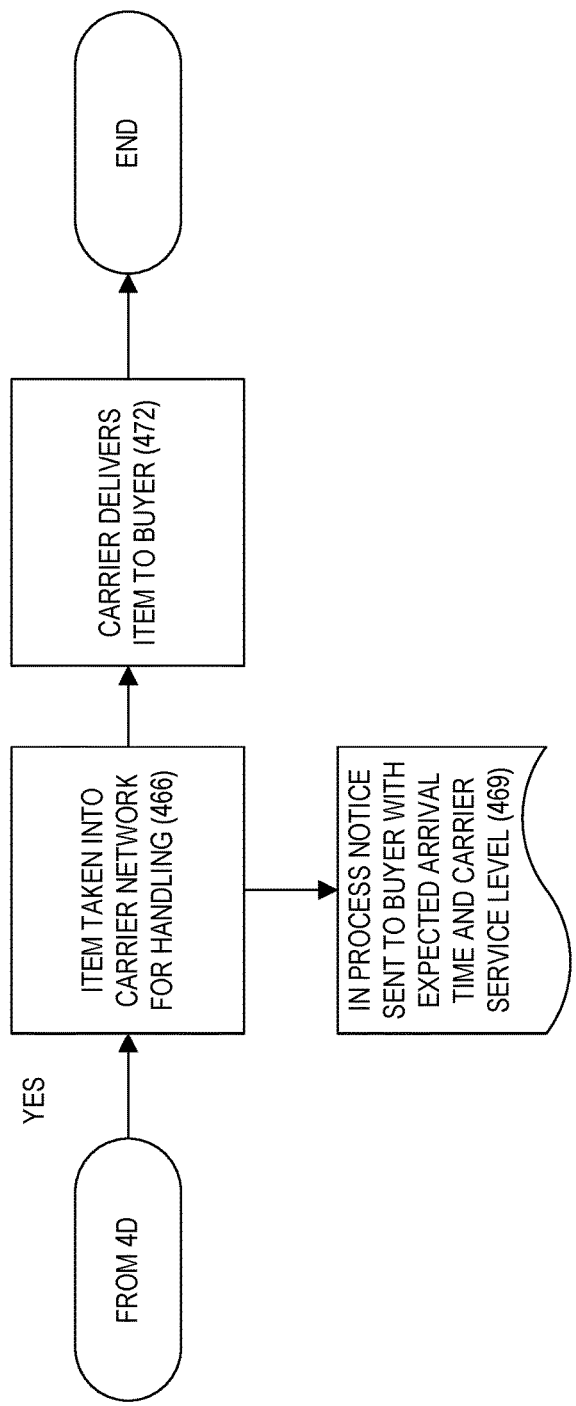
Figure 10A:
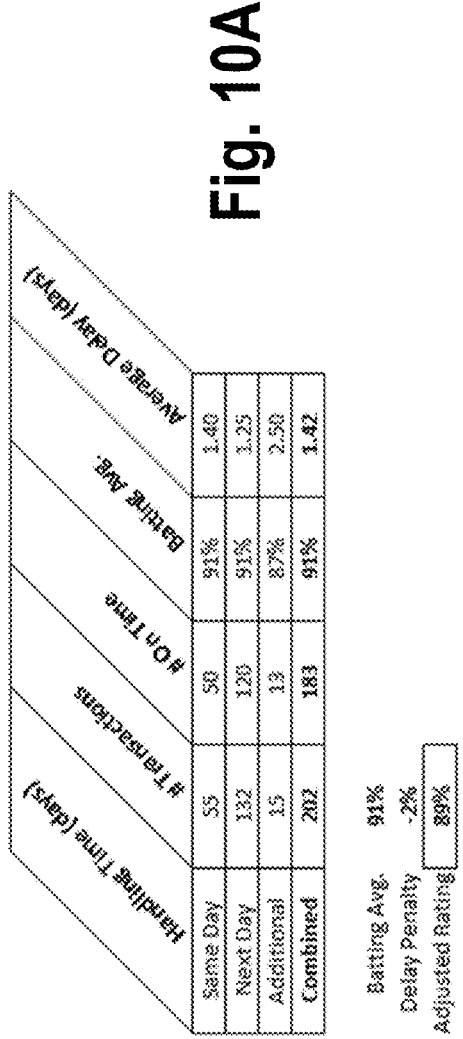
Figure 10B:
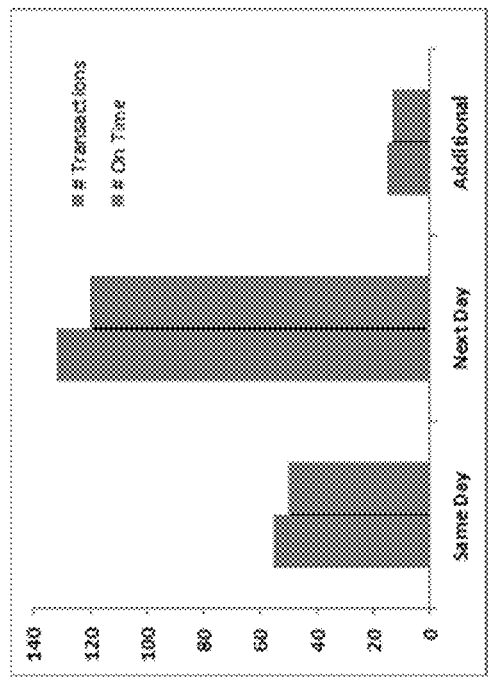
Figure 12:
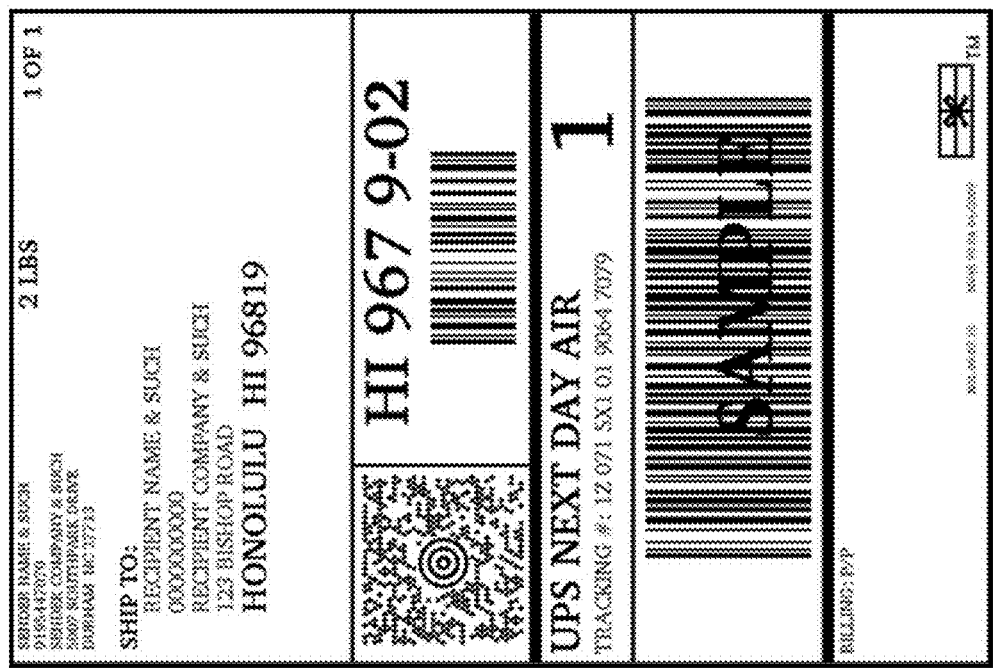

After the item has been ingested into the carrier's transportation and logistics network, the item can be delivered as indicated (Blocks 466, 469, and 472 of FIG. 4E). Further messages to both the seller and buy can be provided by the carrier platform 100 and allow the seller and/or buyer to control delivery of the item as described in U.S. Publ. Appl. No. 2012-0303541 which is hereby incorporated in its entirety by reference. This may include providing messages to the buyer and seller at different points along the delivery route or in response to certain circumstances.

In various embodiments, the above features can create more buyer driven e-commerce that influences the perception of e-commerce. For instance, the all-in price can represent that shipping costs are not a burden by replacing "Free Shipping" with a valuable service embedded in an all-in price. Further, using this approach, sellers will not be able to entice consumers with low prices, only to subsidize profits at checkout with inflated shipping costs. This can provide a competitive marketplace where the buyer is in control of delivery time and price.

7. Affinity Program

In one embodiment, the carrier can reward buyers who are frequent recipients of the carrier's premium services and/or receive higher volume of deliveries. For example, the carrier platform 100 can track the accumulation of rewards points, for instance, and provide rewards to the corresponding sellers and/or buyers. The rewards may be award or reward points, rebates, cash incentives, credits toward future transactions, virtual currencies (e.g., Bitcoins), and/or the like. By way of example, assume a buyer has accumulated 100 rewards points and would like to upgrade the delivery of the iPhone from 5 days to 1 day. The carrier platform 100 can determine that the shipment can be upgraded for 95 reward points and present the same to the buyer as part of the checkout process, which may save the buyer $31.49 for the upgrade (see FIG. 23). Further, as shown in FIG. 24, buyers (e.g., operating buyer computing entities 115) can view the applicable reward points for each transaction and/or the reward points available to the buyer. As will be recognized, the carrier platform 100 for can track, present, and apply reward points to incent buyers to make purchases through the carrier platform 100.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:

storing, via one or more processors, a plurality of item records in a datastore, wherein each of the plurality of records corresponds to item information for an item available for purchase from a seller, the item information for each of the plurality of items identifies two or more delivery zones to which the corresponding item is available for delivery, each of the two or more delivery zones is associated with a shipping cost and a time in transit for the corresponding item, each of the respective sellers is associated with a seller profile, and each of the seller profiles stores a handling score representing a difference between a committed handling time and actual handling time of a respective seller with regard to other sales;

determining when the handling time for at least one of the other sales is exceeded;

responsive to determining that the handling time is exceeded, updating the handling score for the seller by applying a delay penalty to the handling score in the seller profile of said seller;

receiving, via the one or more processors and as input from a user interface, a particular delivery zone of the two or more delivery zones;

generating, via the one or more processors, a presentation of item information stored in a set of the plurality of item records that identify the particular delivery zone, the presentation configured for display via the user interface;

providing, via the one or more processors, the presentation for display via the user interface, wherein the user interface displays the item information as individual listings of the items available for purchase from the sellers, each individual listing identifying at least a time in transit and a handling score for a corresponding seller, wherein the user interface further displays one or more electronically selectable graphics that sort the individual listings for the items available for purchase from the sellers by one or more of the time in transit for the particular delivery zone or by handling scores of the sellers.

2. The method of claim 1, wherein each of the two or more delivery zones is associated with a handling time.

3. The method of claim 1 further comprising:
determining the handling score for each of the sellers; and
storing the handling score for each of the sellers in association with the corresponding seller profiles.

4. The method of claim 1, wherein the shipping cost for each of the two or more delivery zones for one of the items available for purchase is different.

5. The method of claim 1, wherein each of the two or more delivery zones is associated with a delivery service level.

6. The method of claim 1, wherein at least a portion of the item information for each of the plurality of items available for purchase is further sortable by handling time.

7. The method of claim 1 further comprising:
determining whether the handling time for a first item of the plurality of items has been exceeded; and
responsive to determining that the handling time for the first item of the plurality of items has been exceeded, automatically changing the delivery service level for this first item.

8. An apparatus comprising at least one processor and at least one memory including program code, the at least one memory and the program code configured to, with the processor, cause the apparatus to at least:
store a plurality of item records in a datastore, the plurality of item records storing information for items that are available for purchase from sellers, wherein the information stored in each item record identifies delivery zones for one of the items, each of the delivery zones corresponding to a shipping cost and a time in transit for the one item, each of the sellers having a seller profile that stores a handling score representing a difference between a committed handling time and actual handling time of a respective seller with regard to prior sales;
determine when the handling time for at least one of the other sales is exceeded;
responsive to determining that the handling time is exceeded, update the handling score for the seller by applying a delay penalty to the handling score in the seller profile of said seller;
receive, as input from a user interface, a particular delivery zone of the delivery zones;
generate a presentation of item information stored in a set of the plurality of item records that identify the particular delivery zone, the presentation configured for display via the user interface;
provide the presentation for display via the user interface, wherein the user interface displays the item information as individual listings of the items available for purchase from the sellers, each individual listing identifying at least a time in transit and a handling score for a seller corresponding to the item information for the individual listing, wherein the user interface further displays one or more electronically selectable graphics for sorting the individual listings for the items available for purchase from the sellers by at least one of the time in transit for the particular delivery zone or by handling scores of the sellers.

9. The apparatus of claim 8, wherein each of the delivery zones is associated with a handling time.

10. The apparatus of claim 8, wherein the memory and program code are further configured to, with the processor, cause the apparatus to:
determine the handling score for each of the sellers; and
store the handling score for each of the sellers in association with the corresponding seller profiles.

11. The apparatus of claim 8, wherein the shipping cost for each of the delivery zones for an item is different.

12. The apparatus of claim 8, wherein each of the delivery zones is associated with a delivery service level.

13. The apparatus of claim 8, wherein the at least a portion of the item information for each of the plurality of items available for purchase is further sortable by handling time.

14. The apparatus of claim 8, wherein the memory and program code are further configured to, with the processor, cause the apparatus to:
determine whether the handling time for a first item of the plurality of items has been exceeded; and
responsive to determining that the handling time for the first item of the plurality of items has been exceeded, automatically change the delivery service level for this first item.

15. A computer program product comprising at least one non-transitory computer-readable storage medium having computer-readable program code portions stored therein, the computer-readable program code portions comprising:
an executable portion configured to store a plurality of item records in a datastore, the plurality of item records storing information for items that are available for purchase from sellers, wherein the information stored in each item record identifies delivery zones for one of the items, each of the delivery zones corresponding to a shipping cost and a time in transit for the one item, each of the sellers having a seller profile that stores a handling score representing a difference between a committed handling time and actual handling time of a respective seller with regard to prior sales;
an executable portion configured to determine when the handling time for at least one of the other sales is exceeded;
an executable portion configured to, responsive to determining that the handling time is exceeded, update the handling score for the seller by applying a delay penalty to the handling score in the seller profile of said seller;
an executable portion configured to receive, as input from a user interface, a particular delivery zone of the delivery zones;
an executable portion configured to generate a presentation of item information stored in a set of the plurality of item records that identify the particular delivery zone, the presentation configured for display via the user interface;

an executable portion configured to provide the presentation for display via the user interface, wherein the user interface displays the item information as individual listings of the items available for purchase from the sellers, each individual listing identifying a time in transit and a handling score for the seller, wherein the user interface further displays one or more electronically selectable graphics for sorting the individual listings for the items available for purchase from the sellers by at least one of the time in transit for the particular delivery zone or the handling scores of the sellers.

16. The computer program product of claim 15, wherein each of the delivery zones is associated with a handling time.

17. The computer program product of claim 15 further comprising:

an executable portion configured to determine the handling score for each of the sellers; and an executable portion configured to store the handling score for each of the sellers in association with the corresponding seller profiles.

18. The computer program product of claim 15, wherein the shipping cost for each of the delivery zones for an item is different.

19. The computer program product of claim 15, wherein each of the delivery zones is associated with a delivery service level.

20. The computer program product of claim 15, wherein the at least a portion of the item information for each of the plurality of items available for purchase is further sortable by handling time.

21. The computer program product of claim 15 further comprising:

determine whether the handling time for a first item of the plurality of items has been exceeded; and responsive to determining that the handling time for the first item of the plurality of items has been exceeded, automatically change the delivery service level for this first item.

* * * * *

UNITED STATES PATENT AND TRADEMARK OFFICE
CERTIFICATE OF CORRECTION

PATENT NO. : 10,275,824 B2
APPLICATION NO. : 14/467512
DATED : April 30, 2019
INVENTOR(S) : Erik E. Peterson et al.

It is certified that error appears in the above-identified patent and that said Letters Patent is hereby corrected as shown below:

In the Specification

Column 15, Line 51: delete "(e.gl," and replace with --(e.g.,--.

Signed and Sealed this
Twenty-fifth Day of June, 2019

Andrei Iancu
*Director of the United States Patent and Trademark Office*